United States Patent
Kato et al.

[11] Patent Number: 5,581,542
[45] Date of Patent: Dec. 3, 1996

[54] DEVICE AND METHOD OF PERFORMING A SWITCHING CONTROL TO STANDBY SYSTEM IN HYBRID SYSTEM OF DUPLEX SYSTEM AND BACKUP LINE

[75] Inventors: Naoto Kato, Nagoya; Yuichi Iwasawa, Kawasaki, both of Japan

[73] Assignee: Fujitsu Limited, Kanagawa, Japan

[21] Appl. No.: 244,502
[22] PCT Filed: Sep. 30, 1993
[86] PCT No.: PCT/JP93/01401
§ 371 Date: May 27, 1994
§ 102(e) Date: May 27, 1994
[87] PCT Pub. No.: WO94/08413
PCT Pub. Date: Apr. 14, 1994

[30] Foreign Application Priority Data

Sep. 30, 1992 [JP] Japan .................... 4-261747

[51] Int. Cl.⁶ .................................. H04L 12/24
[52] U.S. Cl. .................. 370/219; 370/228; 370/276
[58] Field of Search .................... 370/13, 14, 16, 370/24, 110.1; 371/11.2, 8.2

[56] References Cited

U.S. PATENT DOCUMENTS 5,193,086  3/1993  Satomi et al. .................... 370/16
5,210,740  5/1993  Anzai et al. ..................... 370/16
5,321,394  6/1994  Carlton et al. ................ 370/16 X
5,406,564  4/1995  Okita .............................. 371/8.2

FOREIGN PATENT DOCUMENTS

| 59-161153 | 9/1984 | Japan | H04L 11/20 |
| 1120929 | 5/1989 | Japan | H04L 11/20 |
| 214645 | 1/1990 | Japan | H04L 12/56 |
| 410832 | 1/1992 | Japan | H04L 12/56 |
| 433442 | 2/1992 | Japan | H04L 12/56 |

Primary Examiner—Douglas W. Olms
Assistant Examiner—Russell W. Blum

[57] ABSTRACT

In a device and a method for performing a switching control to a standby system in a hybrid system including a duplex system and a backup line, communication is performed without using a backup line when a line is switched in an exchange. The device includes a first exchange having a pair of communication multiplexers and a communication line management processor. The backup line uses a public network. A second exchange is provided for interchanging between a line connected via the first exchange and the backup line using the public network. A normal notification signal is transmitted to the opposite communication party or second exchange when one of the communication multiplexers is switched to the standby system. A regulation releasing signal is transmitted after the switching operation so that communication is performed without using the backup line.

7 Claims, 18 Drawing Sheets

1

DEVICE AND METHOD OF PERFORMING A SWITCHING CONTROL TO STANDBY SYSTEM IN HYBRID SYSTEM OF DUPLEX SYSTEM AND BACKUP LINE

BACKGROUND OF THE INVENTION

1. Field of the Invention

The present invention relates to a device and a method each of performing a switching control to a standby system in a hybrid system of a duplex system and a backup line.

2. Description of the Prior Art

FIG. 13 is a block diagram showing a hybrid system including a duplex system using a packet exchange and a backup line using a public network. Referring to FIG. 13, numeral 110 represents a first packet exchange. The first packet exchange 110 exchanges frame information (packets). The first packet exchange 110 is constituted of a communication line management processor (MPR) 111, and a pair of a communication multiplexer (CMU 0 system) 112 and a communication multiplexer (CMU 1 system) 113.

The communication line management processor 111 can continue communication by processing data desirably when a transfer occurs between duplex lines.

The pair of communication multiplexers 112 and 113 are connected via different lines, respectively. Line control devices (LC) 114 and 115 are built in the communication multiplexers 112 and 113, respectively.

Numeral 120 represents a second packet exchange. The second packet exchange 120 can exchange frame information (packet), like the first packet exchange 110. The second packet exchange 120 can switch the line to the line via the first packet exchange 110 or the backup line (public network) 160.

Numeral 130 represents a third packet exchange. The third packet exchange 130 can exchange frame information (packet), like the first packet exchange 110. The third packet exchange 130 interchanges the line to the public network 160 or the host 140.

Numeral 140 represents a host. The host 140 transmits desired information in response to a request from the terminal 150. The host 140 is constituted of a CPU, a memory, and other elements. Hence a user can perform a desired communication via the terminal 150.

In such a configuration shown in FIG. 13, the hybrid system including a duplex system using a packet exchange and the backup line 160 using a public network operates in accordance with the signals shown in FIG. 14.

With a communication via the line for the communication multiplexer (CMU 0 system) 112, when the line is transferred to the communication multiplexer (CMU 1 system) 113 (refer to (1) in FIG. 14), the communication line management processor 111 requests the line control device (LC) 114 in the communication multiplexer (CMU 0 system) 112 to perform a transmission queue sweeping operation. The line control device (LC) 114 under the sweeping request outputs a transmission regulation signal frame (RNR, P frame signal) to the opposite station (the second packet exchange 120) to regulate transmission from the opposite station (the second packet exchange 120) and to verify the serial transmission number of an I-frame including data (refer to (2) in FIG. 14).

The opposite station (the second packet exchange 120), which has received the transmission regulation frame, outputs the response (RR, F-frame signal) of a normal notification signal to the line control device (LC) 114 in the communication multiplxer (CMU 0 system) 112. The line control device 114 notifies the communication line management processor 111 of the transfer data communication (refer to (3) in FIG. 14).

That is, the communication multiplexer (CMU 0 system) 112 notifies the processor 111 of the transmission serial number in a transmission waiting state before a switching operation to resume the communication.

The communication line management processor 111 notifies the line control device (LC) 115 in the communication multiplexer (CMU 1 system) 113 of transfer data to reopen the transmission (refer to (5) in FIG. 14) after the communication multiplexer (CMU 0 system) 112 (refer to (4) in FIG. 14) has swept away the transmission queue.

Thereafter, the communication multiplexer (CMU 1 system) 113, which has received the transfer data notification, reopens to accumulate the transmission queue frame corresponding to the event number from the processor 111. The communication multiplexer (CMU 1 system) 113 outputs a command (PR. P frame signal) for a normal notification signal to the opposite station (the second packet exchange 120) (refer to (6) in FIG. 14).

When the communication multiplexer (CMU 1 system) 113 receives a response signal (PR. F frame signal) from the opposite station (the second packet exchange 120) in response to the normal notification signal (PR. P frame signal), the normal communication is reopened (refer to (7) in FIG. 14).

In the hybrid system where the duplex system uses the packet exchange and the backup line uses the public network, the communication line is connected to the backup line with the public line in the following five cases: (1) a transit line trouble (an abnormal signal line, an abnormal data link, a LC trouble, and the like), (2) a line closed due to a command, (3) a RNR frame received, (4) an LC congestion, and (5) an abnormal queue length regulation value of a transmission queue per route.

Regarding the hybrid system including the duplex system using the packet exchange and the backup line using the public network shown in FIG. 13, an explanation will be made as for the communication network structure using a basic communication line and the network structure where a line is switched to the backup line with the public network 160, with reference to FIGS. 15 and 16.

FIGS. 15 and 16 show more in detail the hybrid system including the duplex system shown in FIG. 13 and the backup line using the public network.

The line management processor 111 in the first packet exchange 110 includes a processing unit 111a in the layer 3, a line management unit 111b and a backup control unit 111c.

The line control device 112 includes the processing unit 112a in the layer 1 (L1), a processing unit 112b in the layer 2 (L2), and a operation management unit (not shown). The line control device 113 has the same structure as the line control device 112.

Likewise, the line management processor 121 in the second packet exchange 120 includes a processing unit 121a in a layer 3 (L3), a line management unit 121b, and the backup control unit 121c. The line management processor 131 in the second packet exchange 130 includes a processing unit 131a in a layer 3 (L3), a line management unit 131b, and the backup control unit 131c. The line control device 122 includes a processing unit 122a in the layer 1 and a processing unit 122b in the layer 2. The line control device 132 includes a processing unit 132a in the layer 1 and a processing unit 132b in the layer 2.

The line control device 113 has the same structure as the line control device 112. The line control device 123 has the same structure as the line control device 122.

The host 140 includes a processing unit 140a in the layer 1, a processing unit 140b in a layer 2, the processing unit 140c in the layer 3, and a application processing unit (APL) 140d as a user program.

The terminal 150 includes a processing unit 150a in the layer 1, a processing unit 150b in the layer 2, a processing unit 150c in the layer 3, and a application processing unit 150d as a user program.

In the case of the above architecture using the basic telecommunication line, a communication is performed in the network configuration where the processing units (shaded) are linked to one another as shown in FIG. 15. When the line is switched to the backup line using the public network 160, a communication is performed in the network configuration where the processing units (shaded) are linked to one another as shown in FIG. 16.

When the RNR is received as described in the case (3), the signals are interchanged in the system, as shown in FIG. 17 or FIG. 18 to switch the communication to the backup line using the public network.

That is, the operation management unit 112 in the line control device of the first packet exchange 110 detects the congestion state. Then the processing unit 112b in the layer 2 outputs the RNR. P signal to the second packet exchange 120 via the processing unit 112a in the layer 1 (refer to (a) in FIG. 17).

In the second packet exchange 120, the processing unit 122b in the layer 2 of the line control device 122 receives the RNR. P signal from the processing unit 112b in the layer 2 (refer to (b) in FIG. 17).

Then, the processing unit 122b in the layer 2 produces a signal notifying that the opposite station is in busy, or "opposite station busy signal", to the line control unit 121b in the line management processor 121 (refer to (c) in FIG. 17).

In response to the "opposite station busy signal", the line management unit 121b produces a signal notifying that a trouble has occurred in the transit line, or "transit line trouble signal", to the backup control unit 121c (refer to (d) in FIG. 17).

When receiving a control signal from the backup control unit 121c (refer to (e) in FIG. 17), the line management unit 121b outputs a signal requesting a backup connection, or "backup connection request signal" to the processing unit 122b in the layer 2 (refer to (f) in FIGS. 17 and 18).

Next, the processing unit 122b in the layer 2 outputs a control signal that makes on the signal lines ER, RS, and the like to the processing unit 122a in the layer 1 (refer to (g) in FIG. 18).

The processing unit 122a in the layer 1 outputs the status signal every time each signal line is established (or becomes an on state) (refer to (h) in FIG. 18). After all the signal lines have been established, the SABM signal is transmitted to the third packet exchange 130 (refer to (i) in FIGS. 17 and 18).

In response to the SABM signal, the third packet exchange 130 executes a backup connection process (refer to (j) in FIGS. 17 and 18) while transmits an UA signal acting as a response signal to the SABM signal to the second packet exchange 120 (refer to (k) in FIGS. 17 and 18).

Thereafter, in the second packet exchange 120, the processing unit 122b in the layer 2 in the line control device 122 receives the UA signal and then outputs a "backup connection completion signal" being a signal notifying that the backup connection has been completed to the line control unit 121b in the line management processor 121 (refer to (1) in FIGS. 17 and 18).

The line management unit 121b notifies the backup control unit 121c of the backup connection completion (refer to (m) in FIGS. 17 and 18) while it outputs a "line open signal" acting as a signal notifying the processing unit 121a in the layer 3 of a communication reopen (refer to (n) in FIGS. 17 and 18).

Then the processing unit 121a in the layer 3 communicates using the backup line (refer to (o) in FIGS. 17 and 18).

As described above, in the five cases in each of which the communication line is connected to the backup line using the public network, the backup line communication interchanges the control signal between the second packet exchange 120 and the third packet exchange 130, as shown in FIG. 18.

As described above, even when the line in the first packet exchange is switched, the RNR frame is received so that the line is temporarily connected to the backup line. Therefore there is a disadvantage in that an extra charge is imposed while the communication line is being connected to the backup line using the public network.

SUMMARY OF INVENTION

The present invention is made to overcome the above mentioned problems. An object of the present invention is to provide a device and a method each for performing a switching control to a standby system in a hybrid system including a duplex system and a backup line when a trunk line is switched in a duplex exchange, whereby communication is controlled without using the backup line.

In order to achieve the above object, according to the present invention, the device for performing a switching control to a standby system in a hybrid system including a duplex system and a backup line, the hybrid system having a first exchange including a pair of duplex communication multiplexers and a communication line management processor, the backup line using a public network, and a second exchange for interchanging between a line connected via the first exchange and the backup line using the public network, wherein when the communication multiplexer is switched to the standby system, a transmission regulation signal is transmitted to an opposite communication party to perform a transmission regulation, and a normal communication notification signal is transmitted after a switching operation to resume communication; the first exchange including means for transmitting a normal notification signal to the opposite communication party when the communication multiplexer is switched to the standby system in a hybrid system including a duplex system and a backup line; and means for transmitting a regulation releasing signal after the switching operation.

According to the present invention, the method for performing a switching control to a standby system in a hybrid system including a duplex system and a backup line, the hybrid system having a first exchange including a pair of duplex communication multiplexers and a communication line management processor, the backup line using a public network, and a second exchange for interchanging between a line connected via the first exchange and the backup line using the public network, wherein when the communication multiplexer is switched to the standby system, a transmission regulation signal is transmitted to an opposite communication party to perform a transmission regulation, and a normal communication notification signal is transmitted after a switching operation to resume communication; the method including steps of transmitting a normal notification signal to the opposite communication party when the communication multiplexers are switched to the standby system; and transmitting a regulation releasing signal after the switching operation so that a communication is performed without using the backup line.

In the method for performing a switching control to a standby system in a hybrid system including a duplex system and a backup line, according to the present invention, the regulation releasing signal is a normal notification signal.

Hence, there is an advantage in that communication can be performed without using the backup line by transmitting a normal notification signal to the opposite communication party when the communication multiplexer is switched, and transmitting a retransmission request notification signal after the switching operation.

According to the present invention, the device is provided for performing a switching control to a standby system in a hybrid system including a duplex system anti a backup line, the hybrid system having a first exchange including a pair of duplex communication multiplexers and a communication line management processor, the backup line using a public network, and a second exchange for interchanging between a line connected via the first exchange and the backup line using the public network, wherein when the communication multiplexer is switched to the standby system, a transmission regulation signal is transmitted to an opposite communication party to perform a transmission regulation, and a normal communication notification signal is transmitted after a switching operation to resume communication; the second exchange including timer means for counting a desired time in response to the transmission regulation signal; and control means for inhibiting a switching command to the backup line during the time counting operation of the timer means.

According to the present invention, the method is provided for performing a switching control to a standby system in a hybrid system including a duplex system and a backup line, the hybrid system having a first exchange including a pair of duplex communication multiplexers and a communication line management processor, the backup line using a public network, and a second exchange for interchanging between a line connected via the first exchange and the backup line using the public network, wherein when the communication multiplexer is switched to the standby system, a transmission regulation signal is transmitted to an opposite communication party to perform a transmission regulation, and a normal communication notification signal is transmitted after a switching operation to resume communication; the method comprising the steps of counting a desired time in response to the transmission regulation signal; and communicating without using the backup line during the time counting operation.

There is an advantage in that communication can be performed without using the backup line even if the transmission regulation signal is received during a time counting operation of the timer means.

According to the present invention, the device is provided for performing a switching control to a standby system in a hybrid system including a duplex system and a backup line, the hybrid system having a first exchange including a pair of duplex communication multiplexers and a communication line management processor, a backup line using a public network, and a second exchange for interchanging between a line connected via the first exchange and the backup line using the public network, wherein when the communication multiplexer is switched to said standby system, a transmission regulation signal is transmitted to an opposite communication party to perform a transmission regulation, and a normal communication notification signal is transmitted after a switching operation to resume communication; the hybrid system including backup control protocol having means for transmitting an event notifying a communication multiplex device transfer occurrence before switching to the communication multiplexer; and means for an event notifying a communication multiplex device transfer completion after switching to the communication multiplexer; the second exchange including control means for inhibiting a switching command to said backup line even when the transmission regulation signal is received between the time a communication multiplexer transfer completion notifying event is received and the time a communication multiplexer transfer occurrence notifying event is received.

According to the present invention, the method is provided for performing a switching control to a standby system in a hybrid system including a duplex system and a backup line, wherein when the communication multiplexer is switched to said standby system, a transmission regulation signal is transmitted to an opposite communication party to perform a transmission regulation, and a normal communication notification signal is transmitted after a switching operation to resume communication; the hybrid system including a backup control protocol, the method including the steps of transmitting an event notifying a communication multiplex device transfer occurrence before switching to the communication multiplexer; and transmitting an event notifying a communication multiplex device transfer completion after switching to the communication multiplexer; whereby a communication is performed without using the backup line to the second exchange even when the transmission regulation signal is received between the time a communication multiplexer transfer completion notifying event is received and the time a communication multiplexer transfer occurrence notifying event is received.

Hence, there is an advantage in that communication can be performed without using the backup line even if the transmission regulation signal is received between the time a communication multiplexer transfer occurrence notifying event is received and the time a communication multiplexer transfer completion notifying event is received.

Figure 1:
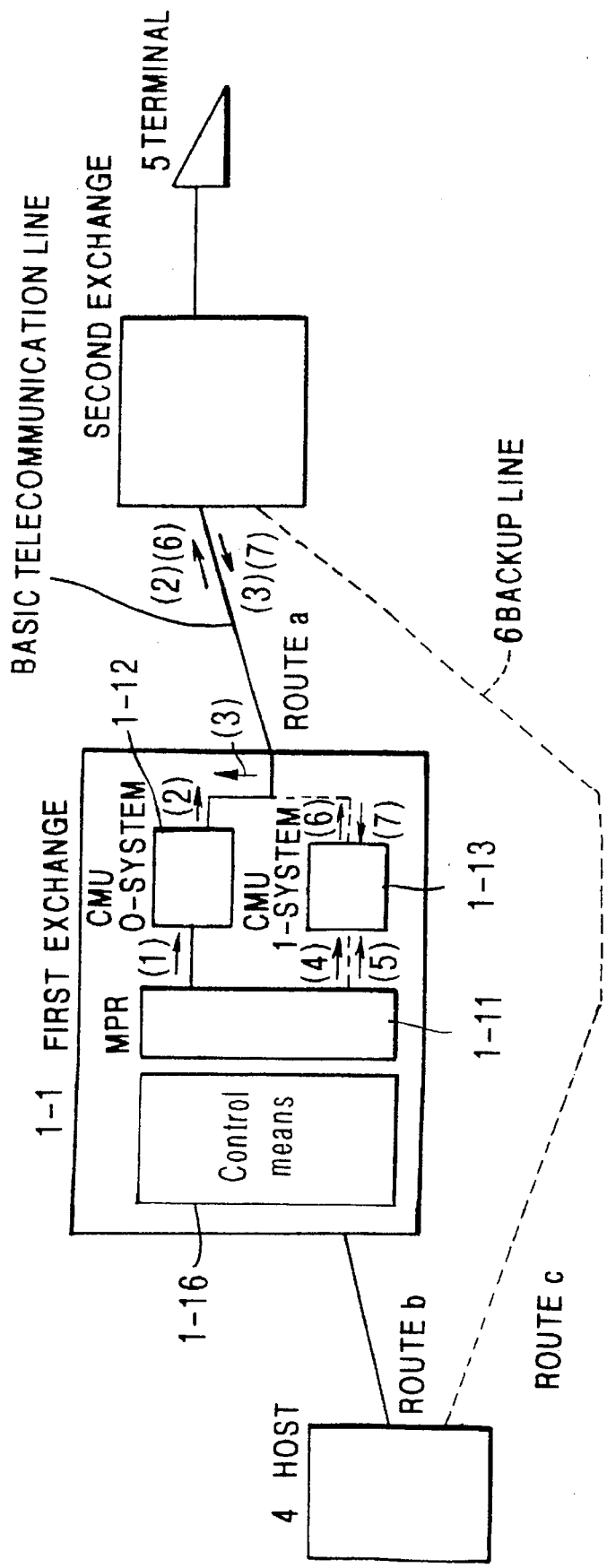
FIG. 1 is a block diagram showing the first aspect of the present invention.

BEST MODE FOR CARRYING OUT THE INVENTION (a) The aspect of the invention:

First the principle of the present invention will be described below. FIG. 1 is a block diagram showing the principle of the present invention. Referring to FIG. 1, numeral 1-1 represents a first exchange. The first exchange 1-1 is constituted of a communication line management processor 1-11, a pair of duplex communication multiplexers 1-12 and 1-13, and control means 1-16.

The communication line management processor 1-11 performs a desired data process when a switching occurs between duplexed lines so that communication is continuously performed.

A pair of communication multiplexers 1-12 and 1-13 are connected via the different lines, respectively, to form a duplex line.

The control means 1-16 notifies the line control device of a sweep command to transmit a normal notification signal to the communication opposite party when the communication multiplexer 1-12 or 1-13 is switched to the standby system, and transmits a retransmission request notification signal after the switching operation. Thus a communication is controlled without using the backup line 6.

Numeral 2-1 represents an exchange. The exchange 2-1 interchanges between the line, via the exchange 1-1, and the backup line 6 using the public network.

Numeral 4 represents a host. The host 4 transmits desired information in accordance with the request from the terminal 5. The host 4 is constituted of a CPU, a memory, and the like. Hence a user can perform a desired communication via the terminal 5.

According to the first aspect of the invention having the above configuration, when the line via the communication multiplexer 1-12 is broken by switching from the communication multiplxer 1-12 to the communication multiplexer 1-13, the communication line management processor 1-11 first requests to the communication multiplexer 1-12 to sweep the transmission queue frame (refer to (1) in FIG. 1).

The communication multiplexer 1-12, which has been subjected to a sweep request, transfers a command for a normal notification signal instead of the communication regulation signal to the second exchange 2-1 under a control of the control means 1-16 (refer to (2) in FIG. 1). The second exchange 2-1 transfers a response signal to the communication multiplexer 112 (refer to (3) in FIG. 1).

The communication multiplexer 1-12 determines that the communication can be continued since the response signal has been received to a command for the normal notification signal. Hence, since the transmission is maintained in spite of the broken line, the transmission data is discarded.

Thereafter, when the transmission standby frame has been gone, the serial number of the frame is notified at the time the communication line management processor 1-11 has interrupted its transmission (refer to (4) in FIG. 1).

The communication line management processor 1-11 notifies the communication multiplexer 1-13 that the line has been switched to the multiplexer 1-13 (refer to (5) in FIG. 1). Then the control means 1-16 controls so as to transfer retransmission request signal, in place of the command for the normal notification signal, to the second exchange 2-1 (refer to (6) in FIG. 1).

This signal is a signal for requesting to resume the transmission from the first transmission serial number in the communication when the line has been switched during the communication.

Then, when the multiplexer 1-13 receives a response signal from the second exchange 2-1 ill response to the retransmission request signal (refer to (7) in FIG. 1), the transmission is resumed from the first transmission serial number regarding the communication at the line switching time.

Figure 2:
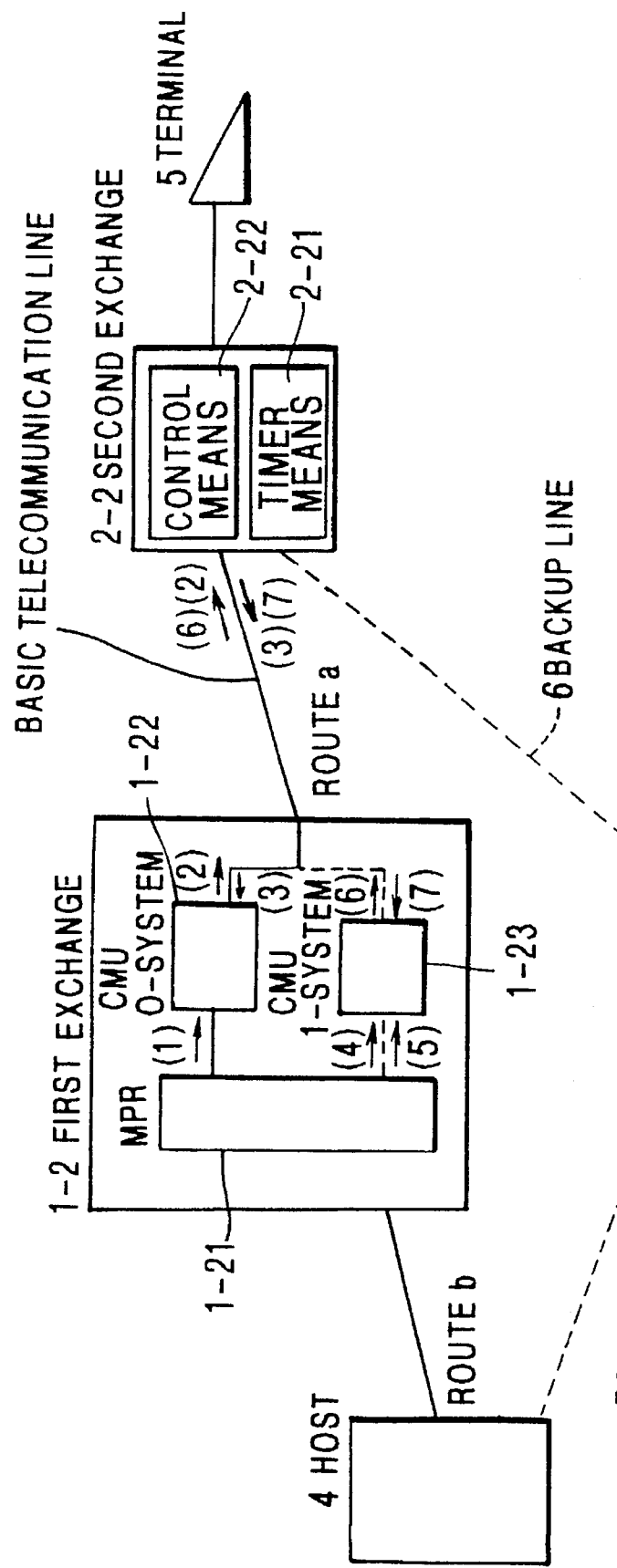
FIG. 2 is a block diagram showing the second aspect of the present invention.

Therefore, according to the device and the method for performing a switching control to a standby system in a hybrid system including a duplex system and a backup line of the first invention, the first exchange including a communication line management processor and a pair of communication multiplexers, and a second exchange which interchanges between the line via the first exchange and the backup line used ill a public network are provided. At a switching time of the communication multiplexer, a transmission regulation is performed by transmitting a transmission regulation signal to the opposite communication party. The communication is resumed by transmitting a normal notification signal after the switching operation. The hybrid system including the duplex system and the backup line has an advantage in that a communication can be performed without using the backup line because control means in the first exchanger transmits a normal notification signal to the opposite communication party at the time the communication multiplexer is switched and transmits a retransmission request signal after the switching operation. FIG. 2 is a block diagram showing the second aspect of the invention. Referring to FIG. 2, numeral 1-2 represents a first exchange. The first exchange 1-2 includes a communication management processor 1-21 and a pair of duplex communication multiplexers 1-22 and 1-23. The communication management multiplexer 1-21 and the duplex communication multiplexers 1-22 and 1-23 are functionally similar to the communication line management processor 1-11 and a pair of duplex communication duplexers 1-12 and 1-13 in the block diagram in FIG. 1 showing the principle of the first invention, respectively.

Numeral 2-2 represents a second exchange. The second exchange 2-2 interchanges between the line via the first exchange 1-2 and the backup line 6 using the public network. The exchange 2-2 includes timer means 2-21 and control means 2-22.

The timer 2-21 receives a transmission regulation signal to perform a desired time count. The control means 2-22 controls communication without using the backup line 6 while the timer means 2-21 performs a time count.

Numeral 4 represents a host. The host 4 transmits desired information in response to a request from the terminal 5. The host 4 is constituted of a CPU, a memory, and similar elements. Hence a user can perform a desired communication through the terminal 5.

According to the second aspect of the invention, when the line via the communication multiplexer 1-22 is broken by switching, for example, from the communication multiplexer 1-22 to the communication multiplexer 1-23, the communication line management processor 1-21 first executes a transmission standby frame sweep request to the communication multiplexer 1-22 (refer to (1) in FIG. 2).

On receiving the sweep request, the communication multiplexer 1-22 transfers a communication regulation signal to the second exchange 2-2 (refer to (2) in FIG. 2). When the communication regulation signal is received, the internal timer means 2-21 in the second exchange starts a desired time counting while a response signal in response to a communication regulation signal is transferred to the communication multiplexer 1-22 (refer to (3) in FIG. 2).

The desired time counting delays the connection time to the backup line 6 to reduce a frequent connection to the backup line 6. Hence when the second exchange 2-2 receives a command for a normal notification signal (to be described later) during the time counting, the control means 2-22 stops the timer means 2-21 to perform the time count so that the communication is switched to the line via the communication multiplexer 1-23 without switching to the backup line 6.

At the time when there is no transmission standby frame during the time counting, the communication line management processor 1-21 notifies of the frame transmission serial number at the time when the transmission has been interrupted (refer to (4) in FIG. 2).

The communication line management processor 1-21 notifies the communication multiplexer 1-23 that the communication has been switched to the line via the communication multiplexer 1-23 (refer to (5) in FIG. 2). In response to the notification, the communication multiplexer 1-23 transfers a command for the normal notification signal to the second exchange 2-2 (refer to (6) in FIG. 2).

Thereafter, the second exchange 2-2 outputs a response signal to a communication multiplexer 1-23 in response to the retransmission request notification signal (refer to (7) in FIG. 2) while the control means 2-22 ceases the time counting operation of the timer means 2-21. As a result, the line is switched to the communication multiplexer 1-23 without switching to the backup line 6.

Therefore, according to the device and the method for performing a switching control to a standby system in a hybrid system including a duplex system and a backup line of the second present invention, the first exchange including a communication line management processor and a pair of duplex communication multiplexers and a second exchange which interchanges between the line via the first exchange and the backup line used in a public network are provided. A transmission regulation is performed by transmitting a transmission regulation signal to the opposite communication party when the communication multiplexer is switched. The communication is resumed by transmitting a normal notification signal after the switching operation. The hybrid system including the duplex system and the backup line has an advantage that a communication can be performed without using the backup line even when the transmission regulation signal has been received during a time counting operation by the timer means because the second exchange includes the timer means for performing a predetermined time count after the transmission regulation signal has been received and predetermined control means.

Figure 3:
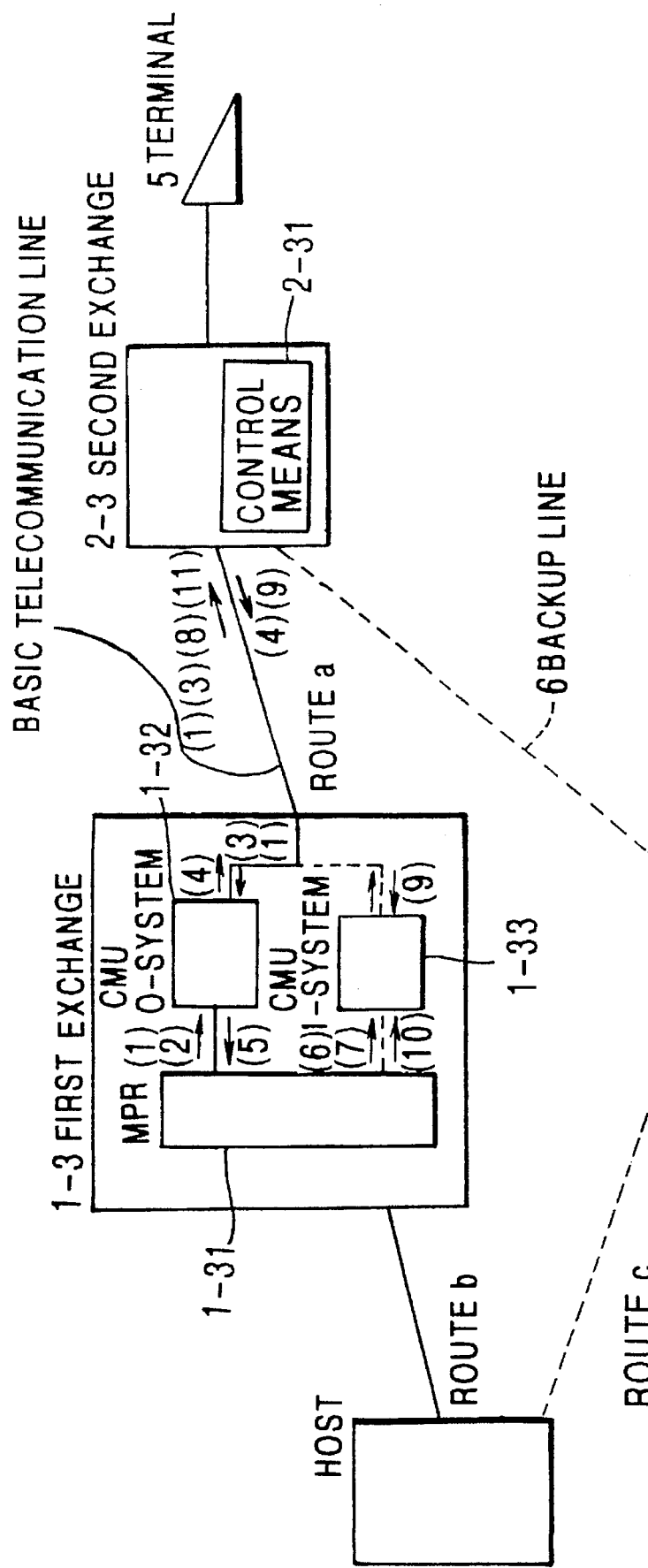
FIG. 3 is a block diagram showing the third aspect of the present invention.

FIG. 3 is a block diagram showing the principle of the third aspect of the invention. The hybrid system, which includes the duplex system shown in FIG. 3 and the backup line 6 using the public network, transmits a transmission regulation signal to the opposite party when one of the communication multiplexers 1-32 and 1-33 is switched to the standby system, thus performing a transmission regulation. The hybrid system also transmits a normal notification signal after a switching operation to resume a communication.

Furthermore, according to the third aspect of the invention, the system includes a backup control protocol that transmits a communication multiplexer transfer notifying event before the communication multiplexer is switched, and a communication multiplexer transfer completion event after the transmission multiplexer has been completely switched.

Numeral 1-3 represents a first exchange. The first exchange 1-3 is constituted of the communication line management processor 1-31 and a pair of duplex communication multiplexers 1-32 and 1-33. The communication line management processor 1-31 and a pair of duplex communication multiplexers 1-32 and 1-33 are functionally similar to the communication line management processor 1-11, and a pair of duplex communication multiplexers 1-12 and 1-13 shown in FIG. 1 being the diagram showing the principle of the first invention, respectively.

Numeral 2-3 represents a second exchange. The second exchange 2-3 switches the route to either the line via the first exchange 1-3 or the backup line 6 using the public network. The second exchange also includes the control means 2-31.

The control means 2-31 controls so as to communicate without using the backup line 6 even when a transmission regulation signal is received during a period between the time a communication multiplexer transfer occurrence notifying event is received and the time a communication multiplexer switching completion notifying event is received.

Numeral 4 represents a host. The host 4 transmits desirable information in response to a request from the terminal 5. The host 4 includes a CPU, a memory and other elements. Hence a user can execute a desirable communication via the terminal 5.

In such a configuration according to the third invention, for example, in order to interchange between the communication multipexers 1-32 and 1-33, the communication line management processor 1-31 previously transmits a communication multiplexer transfer occurrence event to the second exchange 2-3 before a switching operation (refer to (b 1) in FIG. 3).

Thereafter, when the line via the communication multiplexer 1-32 is broken by switching from the communication multiplexer 1-32 to the communication multiplexer 1-33, the communication line management processor 1-31 first requests the communication multiplexer 132 to sweep a transmission standby frame (refer (2) in FIG. 3).

The communication multiplexer 1-32 transfers a communication regulation signal to the second exchange 2-3 in response to the sweep request (refer to (3) in FIG. 3). In response to the communication regulation signal, the second exchange 2-3 transfers a response signal to the communication multiplexer 1-32 (refer to (4) in FIG. 3).

When there are no standby frames during the switching operation, the communication line management processor 1-31 notifies of the transmission serial number of a frame at the time when the transmission is interrupted (refer to (5) in FIG. 3).

The communication line management processor 1-31 notifies the communication multiplexer 1-33 that the communication route has been switched to the line via the communication multiplexer 1-33 (refer to (6) FIG. 3). In response to the content, the communication multiplexer 1-33 transfers a command for a normal notification signal to the second exchange 2-3 (refer to (6) in FIG. 3).

Thereafter, the second exchange 2-3 outputs a response signal to the communication multiplexer 1-33 in response to a command for a normal notification signal (refer to (7) in FIG. 3). Then the communication line management processor 1-31 transmits a communication multiplexer transfer completion notifying event to the second exchange 2-3 (refer to (8) in FIG. 3).

The control means 2-31 built in the exchange 2-3 controls so as not to switch the route to the backup line 6 in reception of the transmission regulation signal till the event is received.

Therefore, according to the device and the method for performing a switching control to a standby system in a hybrid system including a duplex system and a backup line of the third invention, the first exchange including a communication line management processor and a pair of duplex communication multiplexers and a second exchange which interchanges between the line via the first exchange and the backup line used in a public network are provided. A transmission regulation is performed by transmitting a transmission regulation signal to the opposite communication party when the communication multiplexer is switched. The communication is resumed by transmitting a normal notification signal after the switching operation. The hybrid system, including the duplex system and the backup line, transmits a normal communication signal (RR. P frame signal) after a switching operation to resume a communication. The hybrid system includes a backup control protocol that transmits a communication multiplexer transfer occurrence notifying event before the communication multiplexer is switched, and transmits a communication multiplexer transfer completion notifying event after the communication multiplexer has been switched. The second exchange includes predetermined control means. Therefore there is an advantage in that a communication can be performed without using a backup line even when a transmission regulation signal is received during a period between the time a communication multiplexer transfer occurrence notifying event is received and the time a communication multiplexer transfer completion notifying event.

Figure 4:
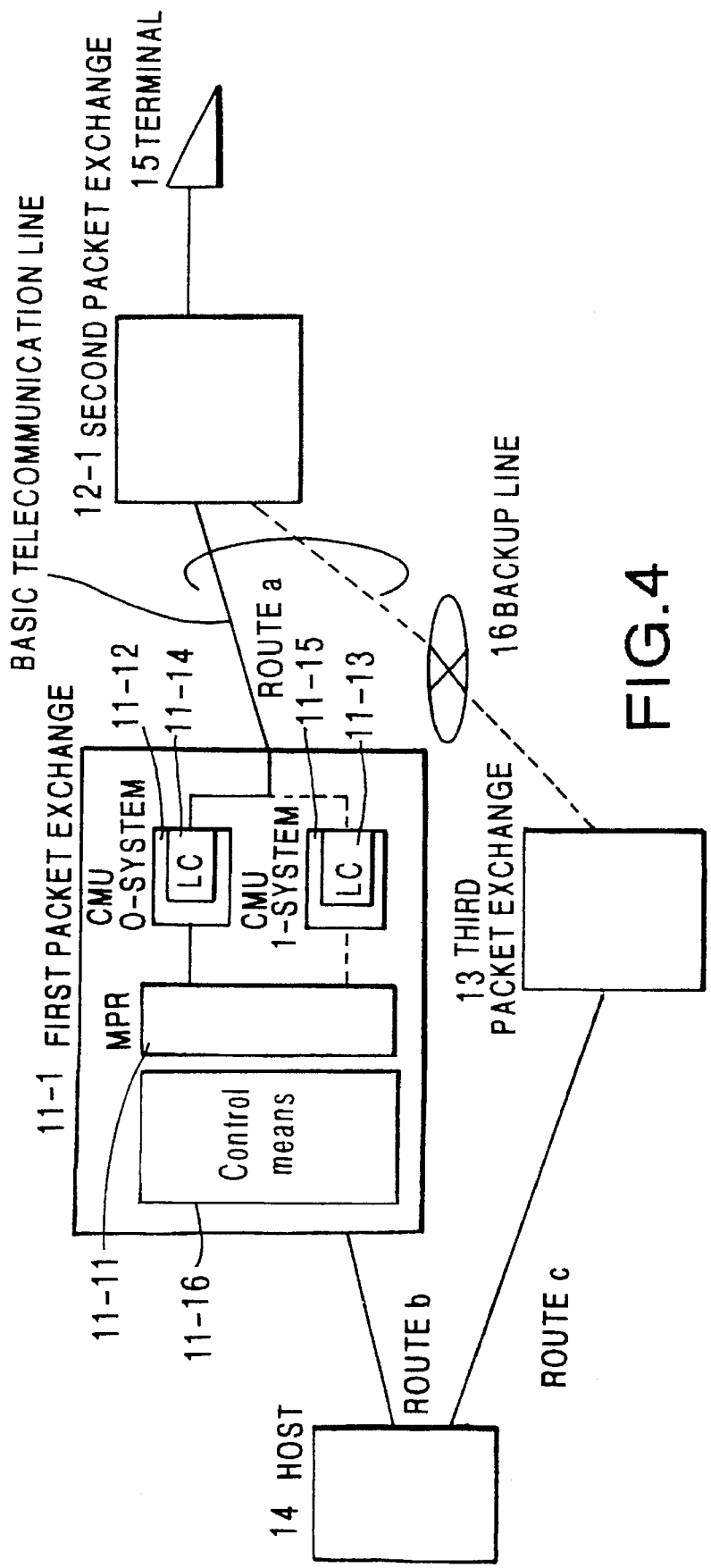
FIG. 4 is a block diagram showing the first embodiment of the present invention.

(b) Explanation of First Embodiment:

FIG. 4 is a block diagram showing the first embodiment of the present invention. Referring to FIG. 4, numeral 11-1 represents a first packet exchange. The first packet exchange 11-1 is constituted of the communication line management processor 11-11, a pair of duplex communication multiplexers 11-12 and 11-13, and the control means 1-16.

The communication line management processor 11-11 can perform a continuous communication by performing a desired data process when a switching operation occurs between duplex lines.

A pair of communication multiplexers 11-12 and 11-13 are respectively connected via the different lines to construct a duplex line. The communication multiplexer 11-12 includes the line control device 11-14 and the communication multiplexer 11-13 includes the line control device 11-15.

Each of the line control devices 11-14 and 11-15 transmits information indicating a transmission signal to the opposite party and operates under a control of the control device 11-16.

The control device 11-16 requests the opposite communication party to transmit a normal notification signal (RR. P frame signal) at a time when the line is interchanged between the communication multiplexers 1-12 and 1-13 and the line control device transmits a retransmission request signal (REJ. P frame signal) after the switching operation. Thus the communication is controlled without using the backup line 16.

Numeral 12-1 represents a second packet exchange. The packet exchange 12-1 switches the route to the line via the first packet exchange 11-1 or the backup line 16 using the public network.

Numeral 13 is a third packet exchange. The third packet exchange 13 is arranged between the backup line 16 with the public network and the host 14. The third packet exchange 13 interchanges between the backup line 16 and the host 14.

Numeral 14 represents a host. The host 14 transmits desired information in response to a request from the terminal 15. The host 14 is constituted of a CPU, a memory, and other elements. Hence a user can perform a desired communication via the terminal 15.

Figure 15:
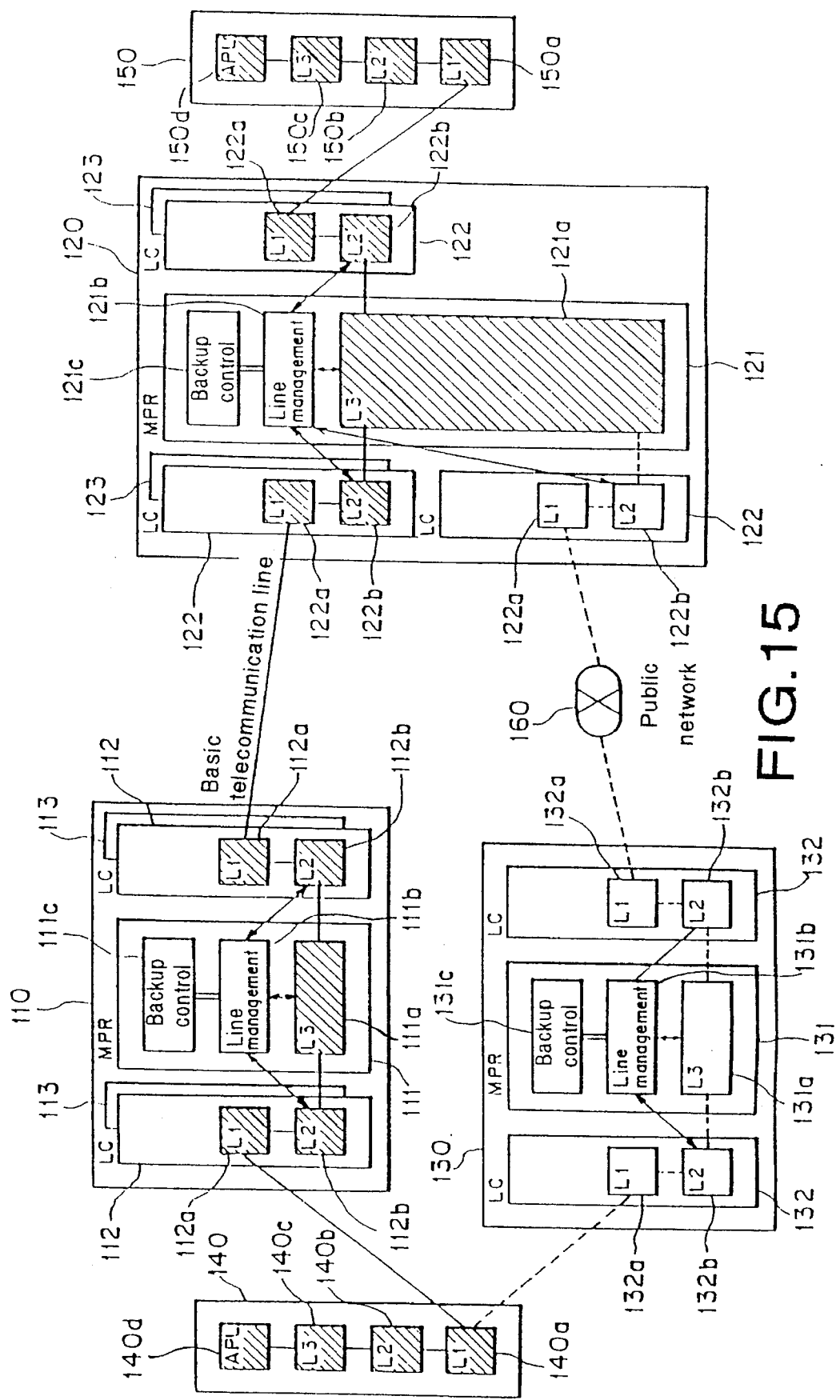
FIG. 15 is a block diagram showing the communication network architecture including a basic telecommunication line in a hybrid system which includes a duplex system using a packet exchange and a backup line using a public network.
Figure 16:
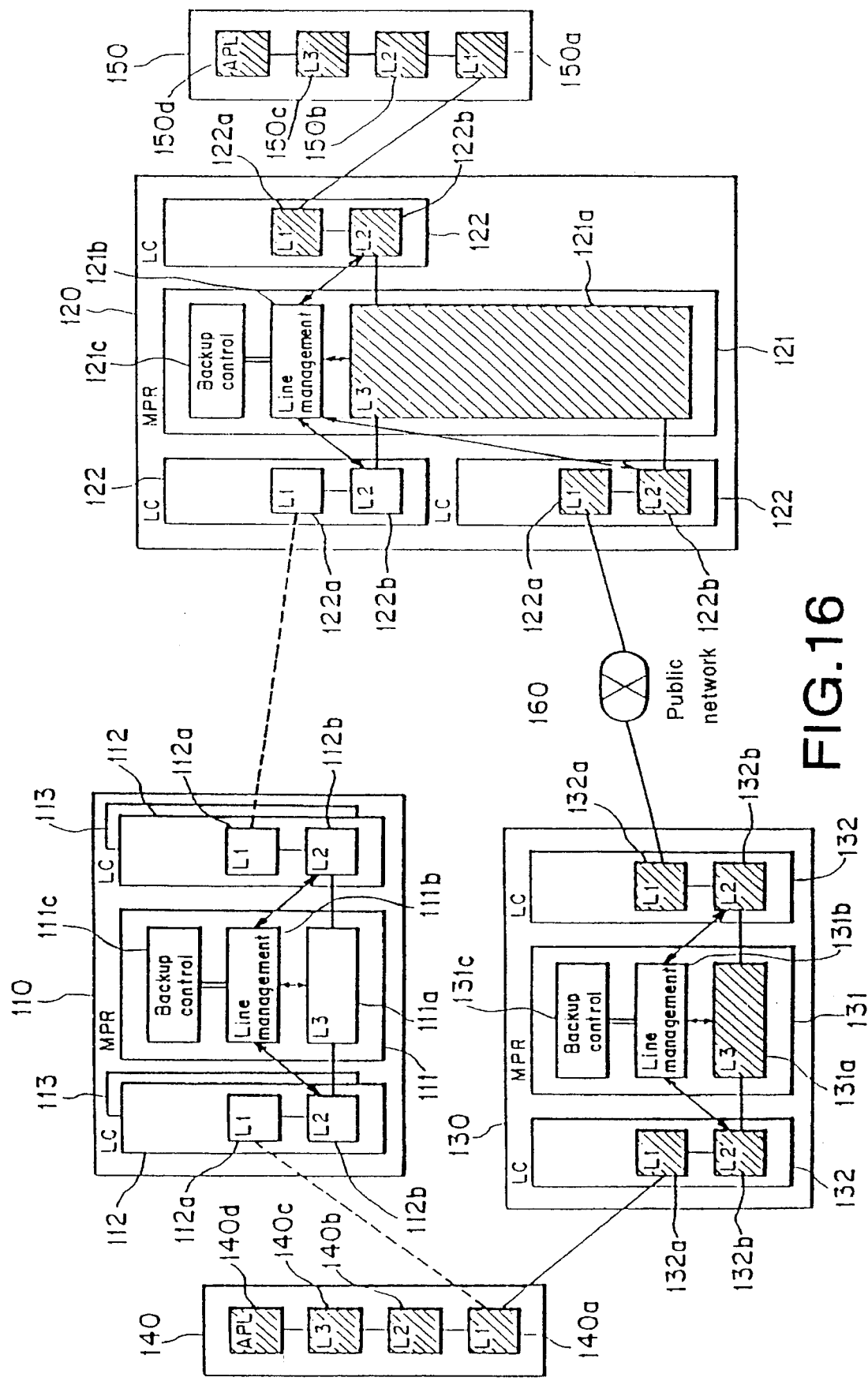
FIG. 16 is a block diagram showing the communication network architecture including a backup line in a hybrid system which includes a duplex system using a packet exchange and a backup line using a public network.

In the hybrid system including the duplex system and the backup line shown in FIG. 4, the first packet exchange 11-1, the second packet exchange 12-1, the third packet exchange 13, the host 14, the terminal 15, and the backup line 16 structurally correspond to the first packet exchange 110, the second packet exchange 120, the third packet exchange 130, the host 140, the terminal 150, and the backup line 160 shown in FIGS. 15 and 16, respectively.

In the above structure, the device and the method which perform a switching control to the standby system in the hybrid system including the duplex system and the backup line according to the first embodiment of the present invention will be explained below with reference to FIG. 5.

For example, during a communication using the line via the communication multiplexer 11-12, it is assumed that the line via the communication multiplexer 11-12 is broken by switching the line from the communication multiplexer 11-12 to the communication multiplexer 11-13. In this case, the communication line management processor 11-11 first requests the communication multiplexer 11-12 to sweep a transmission standby frame (refer to (1) in FIG. 5).

When the communication control device (line control device, LC) 11-14 in the communication multiplexer 11-12 receives the sweep request, it transfers a command (RR. P frame signal) for the normal notification signal (RR frame signal) to the second packet exchange 12-1 under a control of the control device 11-16 instead of the communication regulation signal (RNR. P frame signal), thus confirming the transmission to the transmission frame (refer to (2) in FIG. 5). The second packet exchange 12-1 transfers the response signal (RR. F frame signal) to the communication control device 11-14 (refer to (3) in FIG. 5).

The second packet exchange 12-1 judges that a continuous transmission can be performed because it has received a response signal to the command for the normal notification signal (RR. P frame signal). Hence the transmission data is discarded because the continuous transmission is performed in spite of the broken line.

Figure 5:
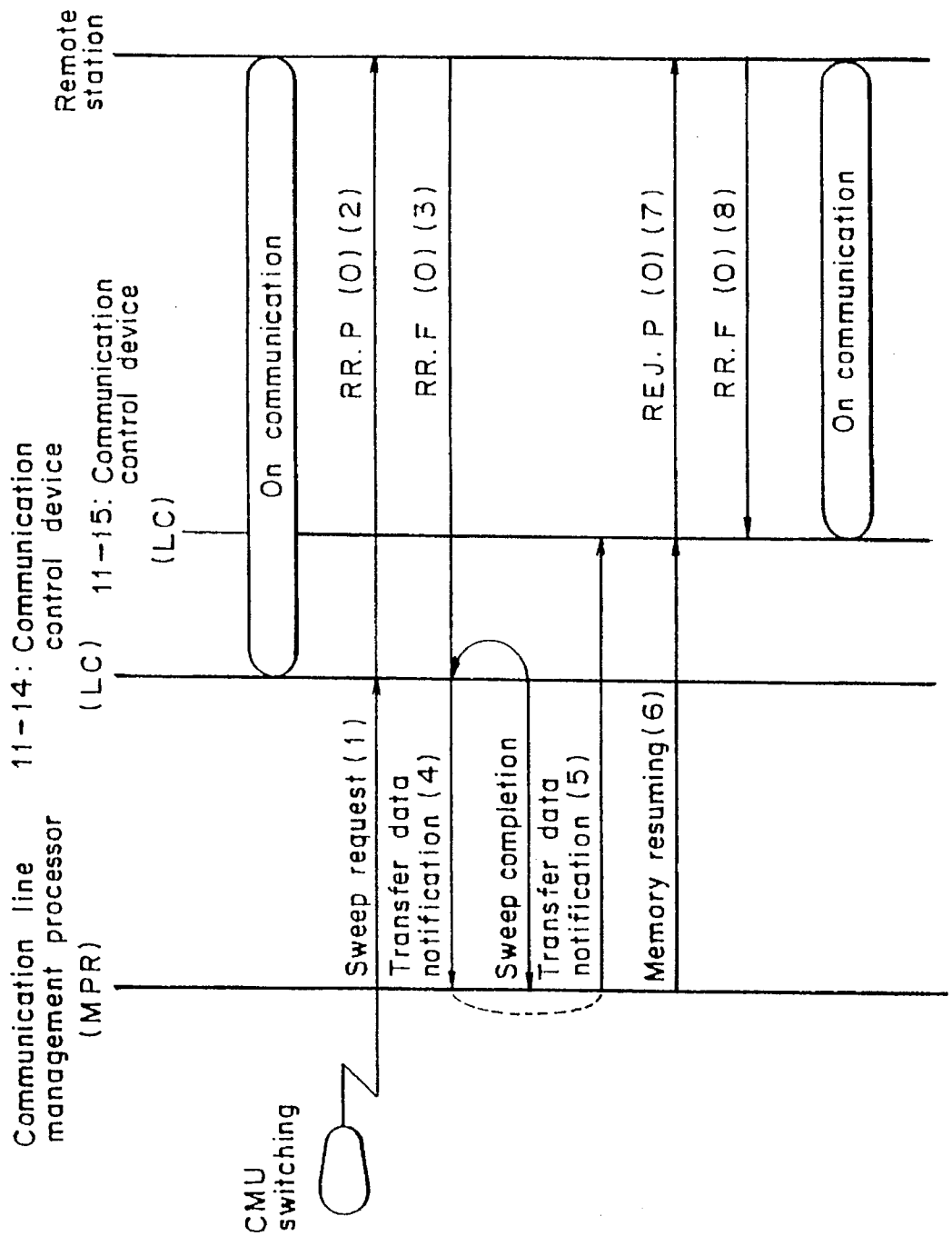
FIG. 5 is a signal sequence diagram in the first embodiment of the present invention.

When there are no response standby frames, the transmission serial number at the interrupted transmission time is notified from the communication control device 11-4 to the communication management processor 11-11 (refer to (4) in FIG. 5).

Thereafter, after the transmission serial number has been returned to the communication control device 11-15, the fact that the route has been switched to the line via the communication multiplexer 11-13 is notified from the communication line management processor 11-11 to the communication control device 11-15 in the communication multiplexer 11-13 (refer to (5) and (6) in FIG. 5).

The communication control device 11-15 transfers the normal notification signal (RR frame signal) or the retransmission request notification signal (REJ. P frame signal) to the second packet exchange 12-1 (refer to (7) in FIG. 5).

The retransmission request notification signal is a signal which requests resuming a transmission from the first serial number of the corresponding transmission when the line is switched during a communication.

Then the communication control device 11-15 receives a response signal to the retransmission request notification signal from the second packet exchange 12-1 (refer to (8) in FIG. 5) and reopens a transmission from the first transmission serial number when a communication switching operation occurs.

In the first embodiment, the hybrid system including the duplex system and the backup line includes the first exchange 11-1 having the communication line management processor 11-11, the communication multiplexers 11-12 and 11-13, and the control device 11-16, the second exchange 12-1, the third exchange 13, the host 14, the terminal 15, and the backup line 16. For example, when the line is interchanged between the communication multiplexer 11-12 and the communication multiplexer 11-13, the normal notification signal is transmitted to the second exchange 12-1 and the retransmission request notification signal is transmitted after the switching operation. Since the communication can be controllably communicated without using the backup line 16, the use frequency of the backup line 16 is reduced so that an economical communication system can be realized.

According to the first embodiment, when the first packet exchange 12-1 receives an I frame after the normal notification signal (refer to (2)) is transmitted to the second packet exchange 12-1 in FIG. 5, a retransmission request notification signal (REJ. P signal, refer to (7)) is outputted. However, when the I frame is not received, the normal notification signal (RR. P signal) is outputted.

Figure 6:
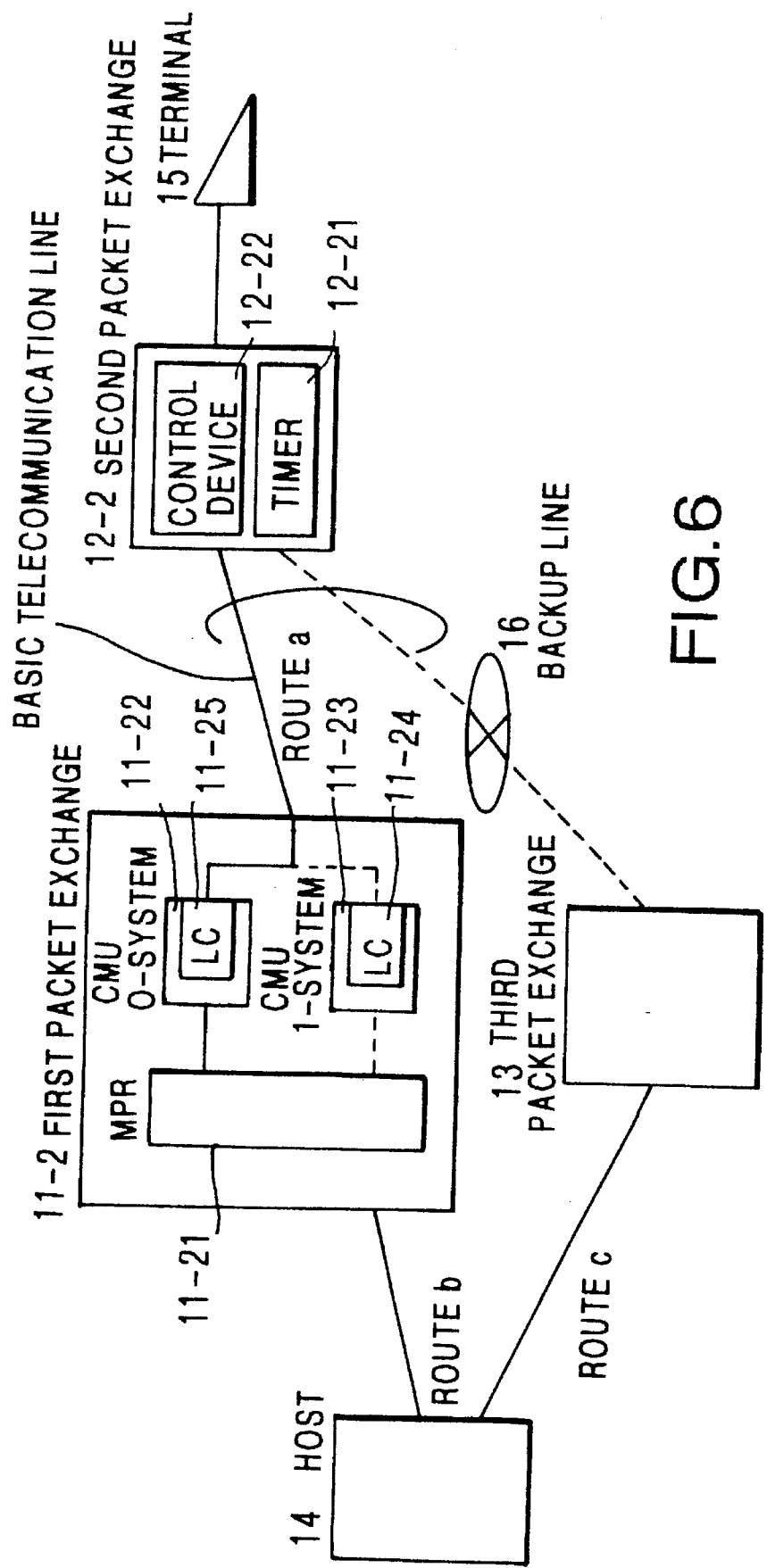
FIG. 6 is a block diagram showing the second embodiment of the present invention.

(c) Explanation of Second Embodiment:

FIG. 6 is a block diagram showing the second embodiment of the present invention. Referring to FIG. 6, numeral 11-2 represents a first packet exchange. The first packet exchange 11-2 is constituted of the communication line management processor 11-21 and a pair of duplex communication multiplexers 11-22 and 1-23. The communication line management processor 11-21 and a pair of duplex communication multiplexers 11-22 and 1-23 correspond functionally to the communication line management processor 11-11 and a pair of duplex communication multiplexers 11-12 and 11-13 shown in FIG. 4 being a block diagram showing the first embodiment of the present invention.

Numeral 12-2 represents a second packet exchange. The second packet exchange 12-2 interchanges between the line via the first packet exchange 11-2 and the backup line 16 using the public network. The second packet exchange 12-2 includes the timer 12-21 and the control device 12-22.

Figure 7:
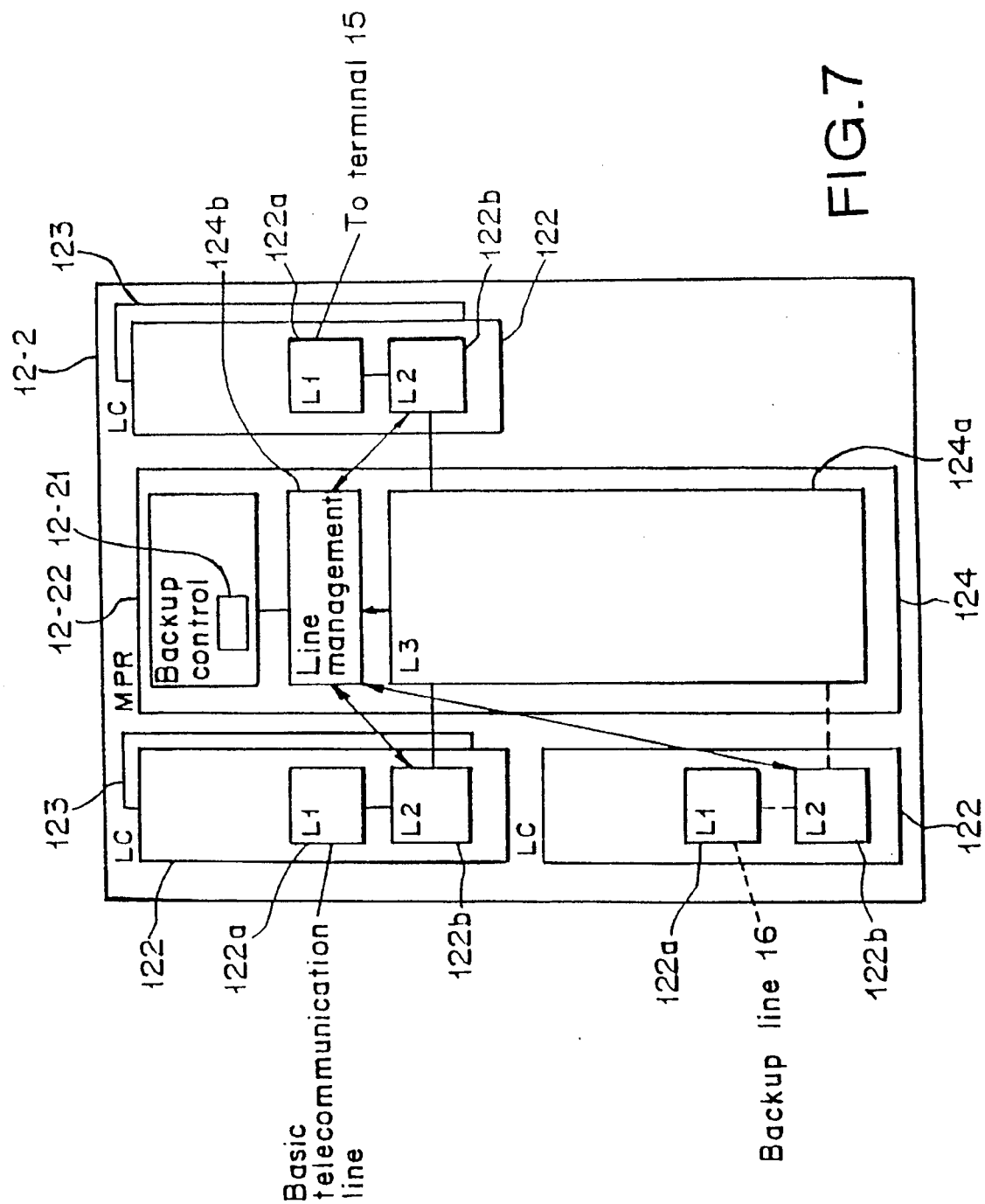
FIG. 7 is a diagram showing in detail the second packet exchange according to the second embodiment of the present invention.

Moreover, the second packet exchange 12-2 has the configuration shown in detail in FIG. 7. That is, the second packet exchange 12-2 includes the line control devices 122 and 123 which correspond functionally to those in the second packet exchange 120 shown FIGS. 15 and 16. However, the backup control unit (control device) 12-22 in the communication line management processor 124 includes the timer 12-21.

The timer 12-21 performs a desired time counting operation in response to the transmission regulation signal. The control device 12-22 controls the communication without using the backup line 16 during the time counting operation of the timer 12-21.

That is, when the backup control unit 12-22 in the communication line management processor 124 receives the transmission regulation signal, the timer 12-21 activates to start a desired time counting operation. However, even if the transmission regulation signal is received, the backup control unit 12-22 controls so as not to connect it to the backup line 16 during the time counting operation.

In FIG. 7, numeral 122*a* represents a processing unit for a layer 1, 122*b* represents a processing unit for a layer 2, 124*a* represents a processing unit for a layer 3, and 124*b* represents a line management unit.

Furthermore, in FIG. 6, numeral 13 represents a third packet exchange. The third packet exchange 13 is arranged between the backup line 16 using the public network and the host 14 to perform an interchange in communication between the backup line 16 and the host 14.

Numeral 14 represents a host. The host 14 transmits desired information in response to a request from the terminal 15, whereby a desired communication can be performed through the terminal 15 in the same way as the host 14 in the first embodiment shown in FIG. 4.

In the hybrid system including the duplex system and the backup system shown in FIG. 6, the first packet exchange 11-2, the third packet exchange 13, the host 14, the terminal 15, and the backup line 16 correspond structurally to the first packet exchange 110, the third packet exchange 130, the host 140, the terminal 150, and the backup line 160 shown in FIGS. 15 and 16, respectively.

In the above structure, the functions of the device and the method each which performs a switching control to the standby system in the hybrid system including the duplex system and the backup line according to the second embodiment of the present invention will be explained below with reference to FIGS. 8 and 9.

Figure 8:
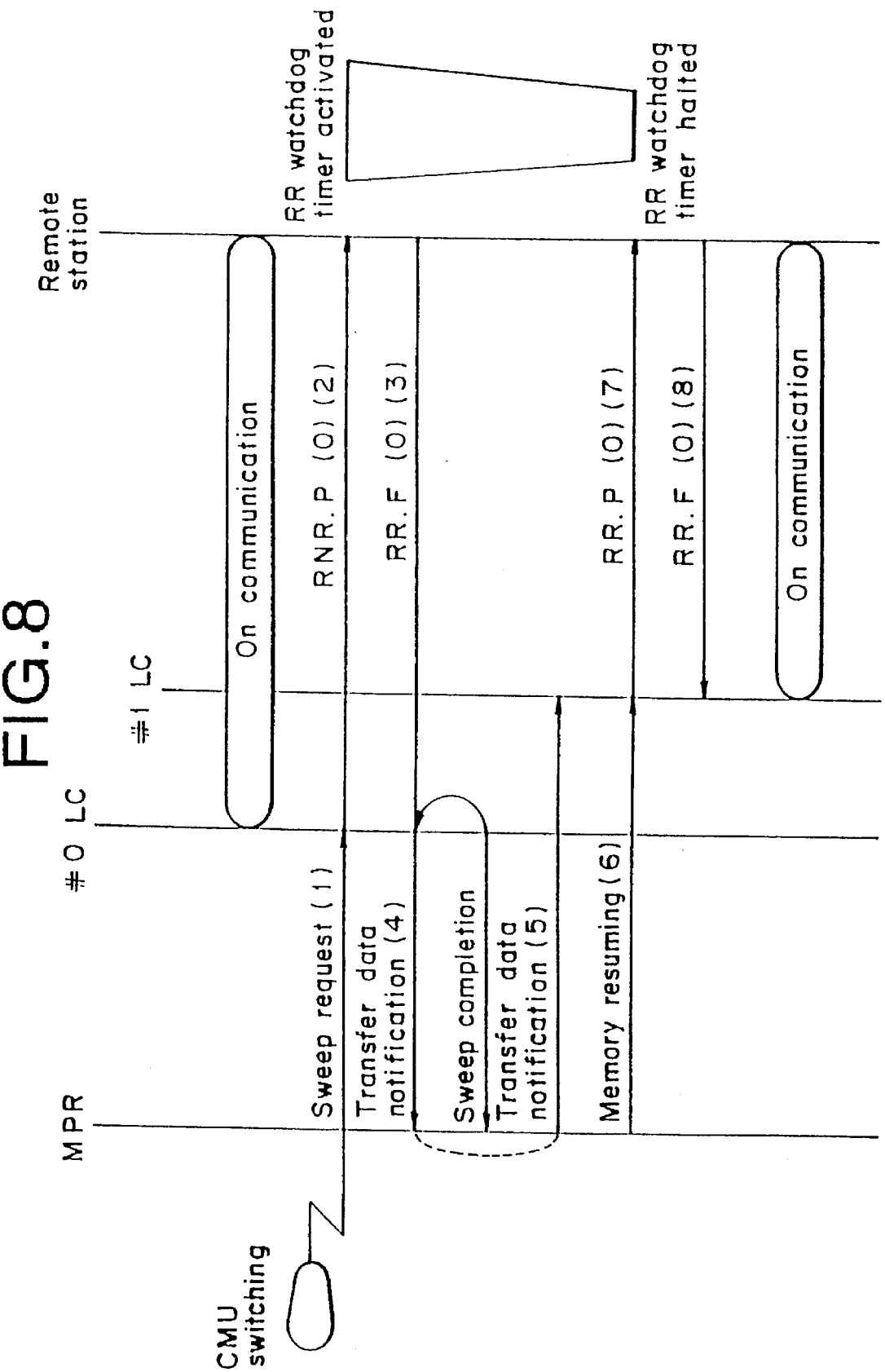
FIG. 8 is a signal sequence diagram in the second embodiment of the present invention.
Figure 9:
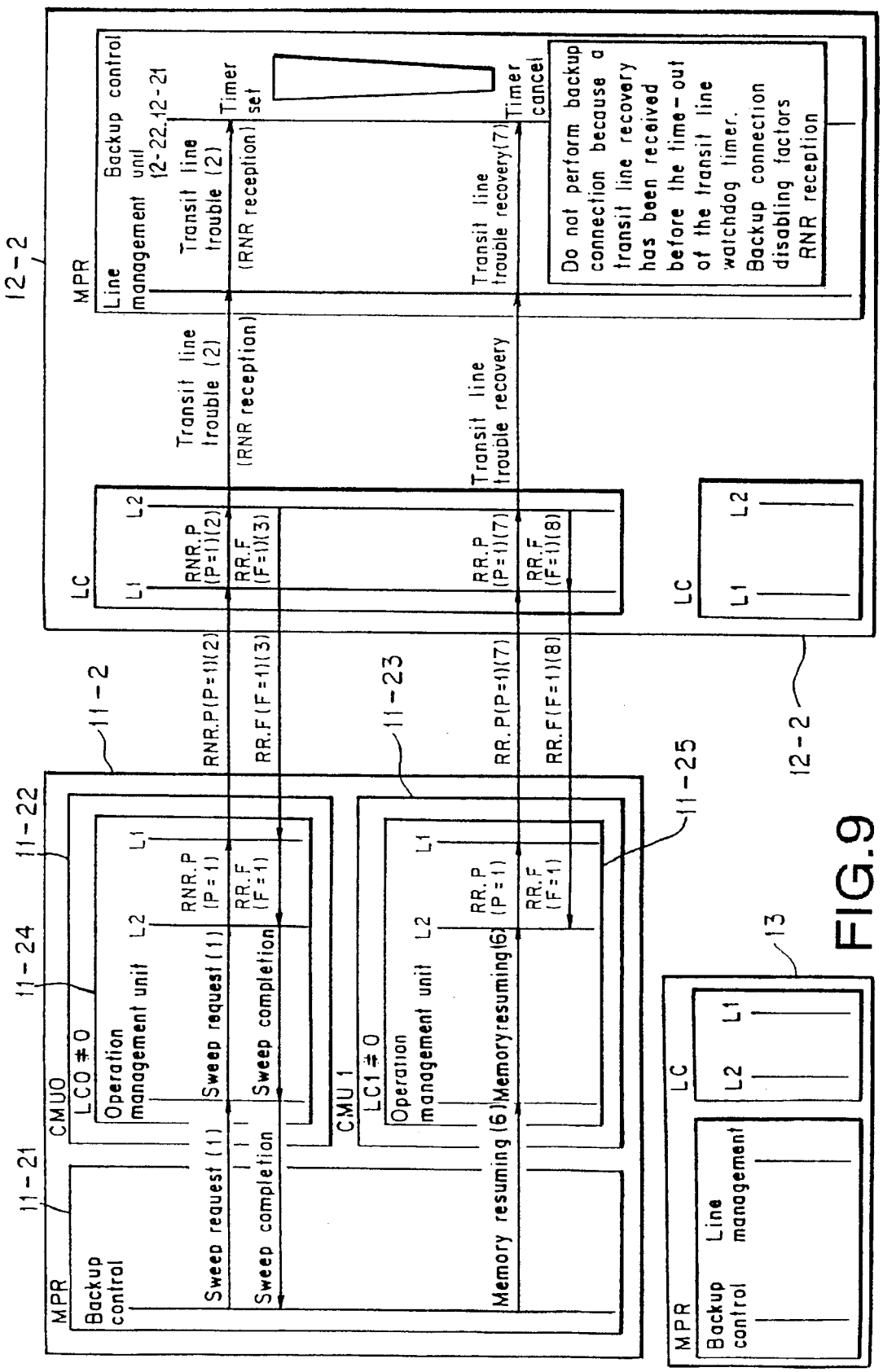
FIG. 9 is a signal sequence diagram in the second embodiment of the present invention.

For example, with a communication being performed using a line via the communication multiplexer 11-22, when a switching operation front the communication multiplexer 11-22 to the communication multiplexer 11-23 breaks the line via the communication device 11-22, the communication line management processor 11-21 executes a transmission standby frame sweep request to the communication multiplexer 11-22 (refer to (1) in FIGS. 8 and 9).

The communication multiplexer 11-22, which has received the sweep request, transfers a communication regulation signal (RNR. P frame signal) to the second packet exchange 12-1 (refer to (2) in FIGS. 8 and 9). In response to the communication regulation signal, the timer 12-21 built-in the second packet exchange 12-2 starts a desired time counting operation while a response signal (RR. F frame signal) to the communication regulation signal is transferred to the communication multiplexer 11-22 (refer to (3) in FIGS. 8 and 9).

In other words, as shown in the signal sequence diagram in FIG. 9, the second packet exchange 12-2 receives the transmission regulation signal to input to the processing unit 122*b* for the layer 2. Then, the processing unit 122*b* for the layer 2 outputs a transit line alarm signal notifying that the transmission regulation signal has been received, to the backup control unit 12-22 in the line management processor 124 (refer to (2) in FIG. 9).

In response to the transit line alarm signal, the timer 12-21 built-in the backup control unit 12-22 starts a desired time counting operation (refer to (3) in FIG. 9).

Since the desired time counting operation delays the time required to connect to the backup line 16, the frequency of use of the backup line 16 is reduced.

The backup control unit 12-22 waits for receiving the command (RR. P frame signal) for a normal notification signal (RR frame signal) to be described later without performing the backup connecting command (refer to (e) in FIGS. 17 and 18) (as described above) to connect to the backup line 16 during the counting operation.

When the normal notification signal has been received, the timer 12-21 stops its time counting operation, the route is switched to the line via the communication multiplexer 11-23 without directing to the backup line 16.

Figure 17:
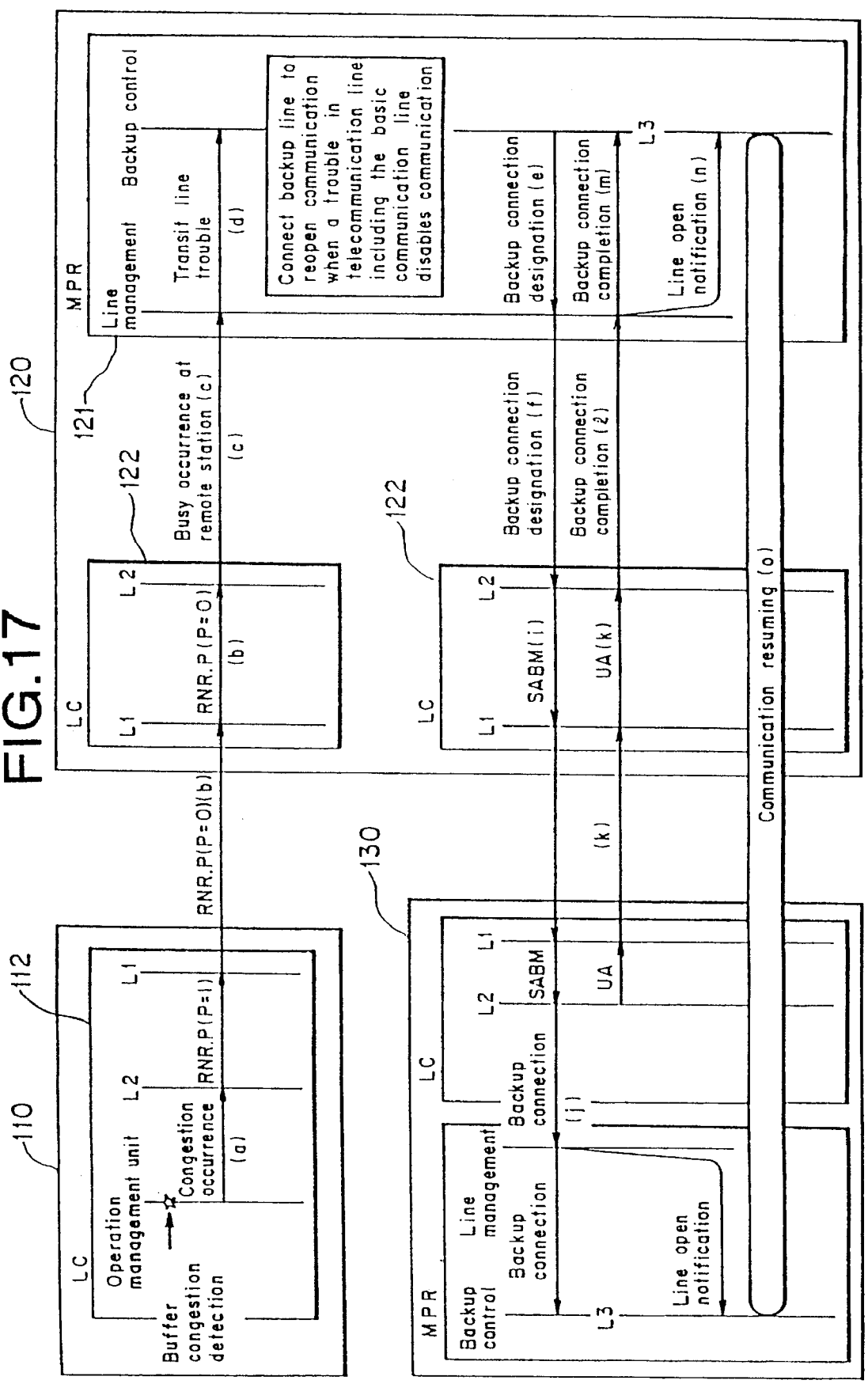
FIG. 17 is a signal sequence diagram for a system in which a backup line receives an RNR frame.
Figure 18:
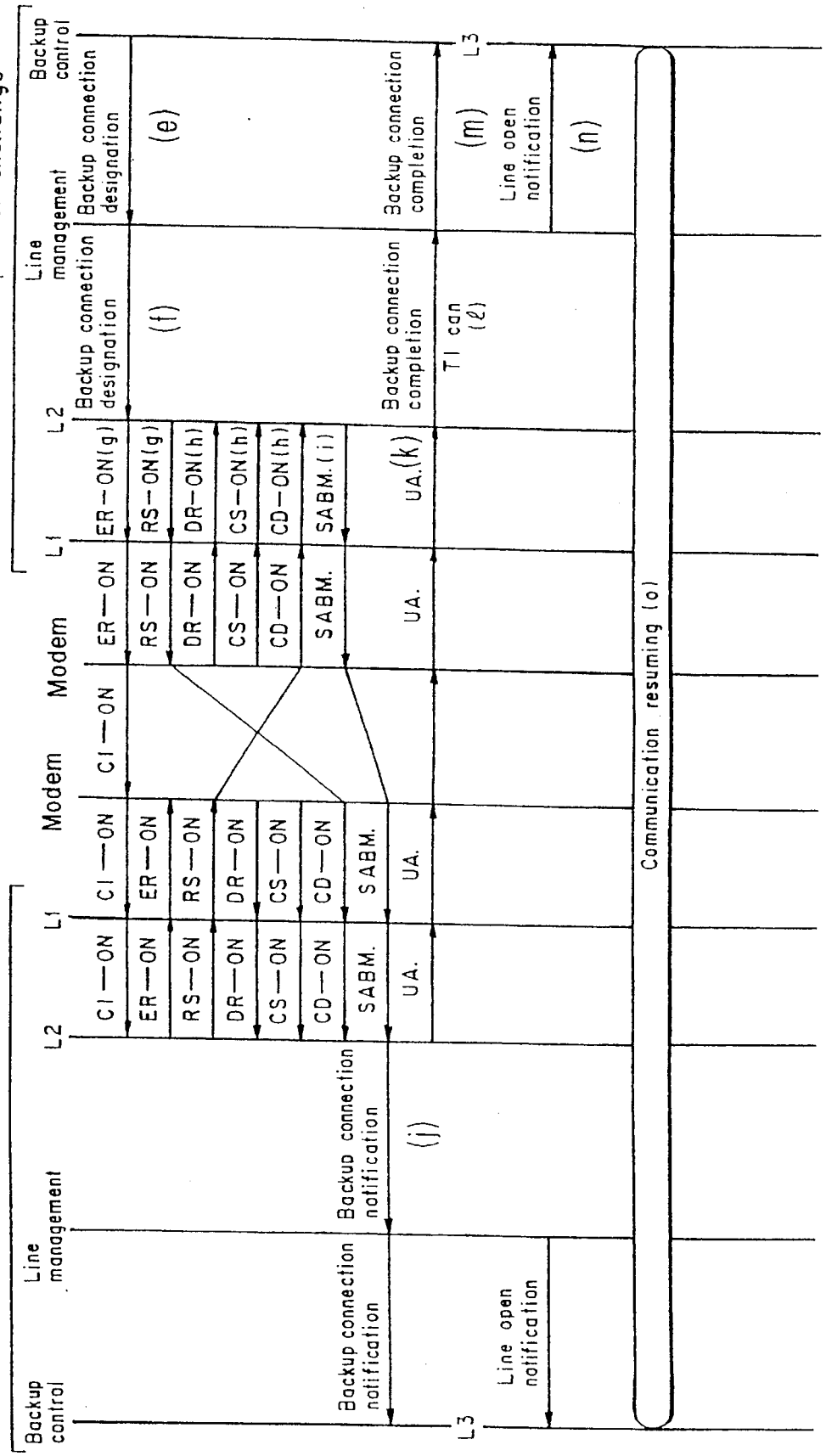
FIG. 18 is a signal sequence diagram for a system connected to a backup line using a public network.

When the timer 12-21 has completed (come to a time-out) its time counting operation without receiving the normal notification signal, a signal process (refer to (e) to (o) in FIGS. 17 and 18) to connect to the backup line 16 is performed to switch to the backup line 16.

When there is no transmission standby frame during the time counting operation, the transmission serial number of a frame at a transmission interruption time is notified from the communication control device 11-24 to the communication management processor 11-21 (refer to (4) in FIG. 8).

Thereafter, after the transmission serial number is returned to the communication control device 11-25, the fact that the line via the communication multiplexer 11-23 has been switched is notified from the communication line management processor 11-21 to the communication multiplexer 11-23 (refer to (5) and (6) in FIG. 8 and (6) in FIG. 9).

The communication multiplexer 11-23, which has received the above information, transfers the command for the normal notification signal (RR. P frame signal) to the second packet exchange 12-1 (refer to (7) in FIGS. 8 and 9).

Thereafter, the second packet exchange 12-1 outputs a response signal corresponding to the retransmission request notification signal to the communication multiplexer 11-23 (refer to (8) in FIGS. 8 and 9) while the control device 12-22 halts the time counting operation of the timer 12-21. Thus the route is switched to the line via the communication multiplexer 11-23 instead of the backup line 16.

As described above, the hybrid system control device using the hybrid switching method and including the duplex system and the backup line, comprises the communication line management processor 11-21, the first packet exchange with the communication multiplexers 11-22 and 11-23, the timer 12-21, and the second packet exchange 12-2 with the control device 12-22 are used instead of the first packet exchange 11-1 and the second packet exchange 12-1. In response to a transit line alarm signal, the timer 12-21 performs a desired time counting operation. The system waits for the normal notification signal from the standby system without switching to the backup line 16 during the time counting operation. Since the communication is controlled without using the backup line 16, the frequency in use of the backup line 16 can be reduced so that an economical communication system can be realized.

Figure 10:
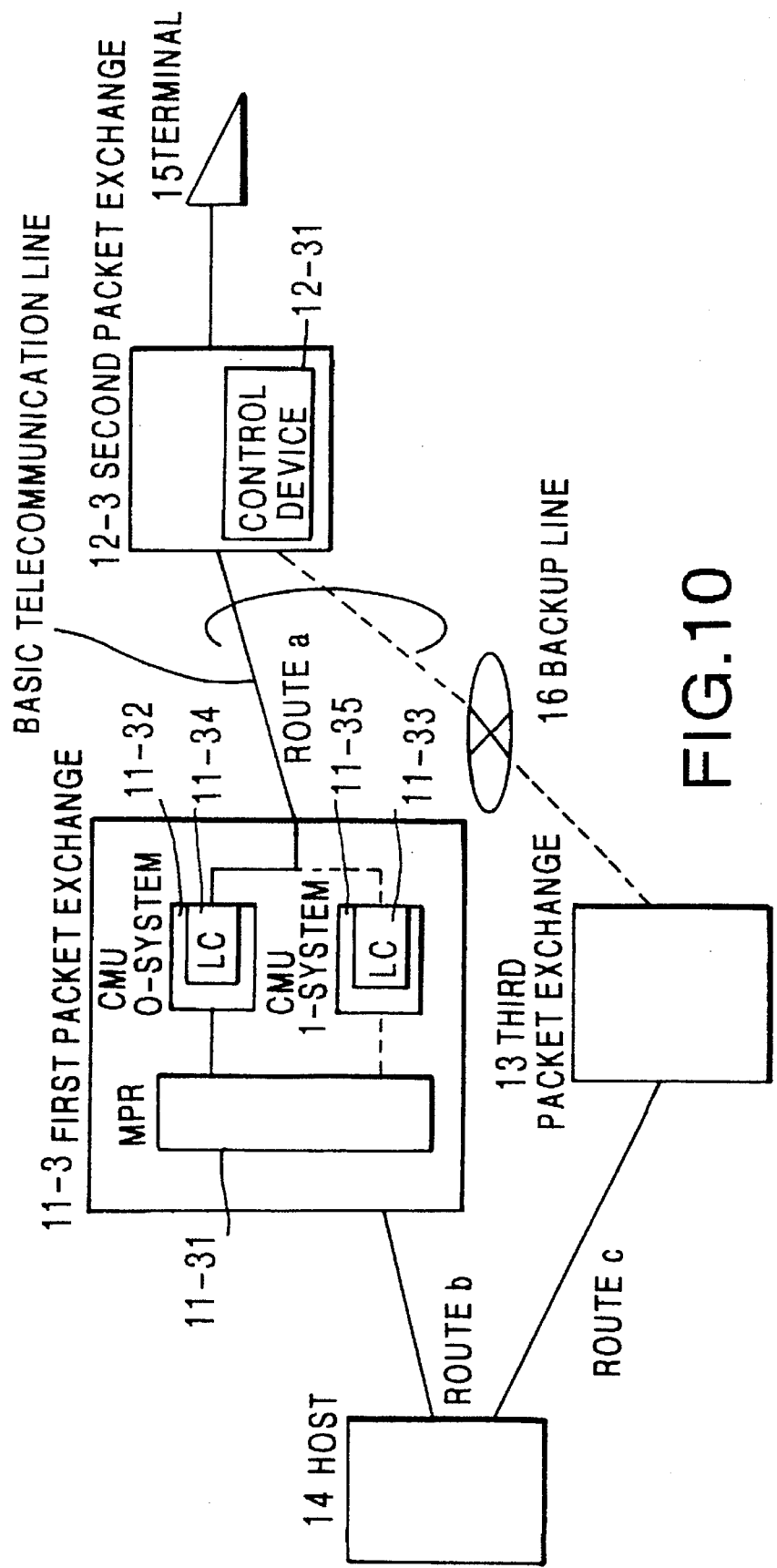
FIG. 10 is a block diagram showing the third embodiment of the present invention.

(d) Explanation of Third Embodiment:

FIG. 10 is a block diagram showing the third embodiment according to the present invention. The hybrid system including the duplex system and the backup line shown in FIG. 10 corresponds to the one shown in FIGS. 15 and 16.

The hybrid system, which includes the duplex system and the backup line 16 using the public network shown in FIG. 10, transmits a transmission regulation signal to the opposite communication party when the line is interchanged between the communication multiplexers 11-32 and 11-33 so that a transmission regulation is performed. The communication is resumed by transmitting a normal notification signal (RR. P frame signal) after a switching operation.

Moreover, in the third embodiment, a backup control protocol is prepared, which transmits an event notifying of a communication multiplexer transfer occurrence before the switching operation of the communication multiplexer and transmits an event notifying of a communication multiplexer transfer completion after the switching operation of the communication multiplexer. Numeral 11-3 represents a first packet exchange. The first packet exchange 11-3 includes a communication line management processor 11-31 and a pair of duplex communication multiplexers 11-32 and 11-33. The communication line management processor 11-31 and a pair of duplex communication multiplexers 11-32 and 11-33 correspond functionally to the communication line management processor 11-11 and a pair of duplex communication multiplexers 11-12 and 11-13 shown in FIG. 4 being a block diagram of the first embodiment of the present invention.

Numeral 12-3 represents a second packet exchange. The second packet exchange 12-3 interchanges between the line via the first packet exchange 11-3 and the backup line 16 using the public network. The second packet exchange 12-3 includes a backup control unit (control device) 12-31.

The backup control unit 12-31 controls so as to communicate without the backup line 16 even if a transmission regulation signal is received during a period between the time a communication multiplexer transfer occurrence notifying event is received and the time a communication multiplexer transfer completion notifying event is received.

Numeral 14 is a host. The host 14 transmits desired information in response to a request from the terminal 15. The host 15 is constituted of a CPU, a memory, and other elements. Hence a user can perform a desired communication via the terminal 15.

In the hybrid system including the duplex system and the backup line shown in FIG. 4, the first packet exchange 11-3, the second packet exchange 12-3, the third packet exchange 13, the host 14, the terminal 15, and the backup line 16 correspond structurally to the first packet exchange 110, the second packet exchange 120, the third packet exchange 130, the host 140, the terminal 150, and the backup line 160, shown in FIGS. 15 and 16, respectively.

Next, the device and the method each which perform a switching control to the standby system in a hybrid system including the duplex system and the backup line according to the third embodiment of the present invention will be explained with reference to FIGS. 11 and 12.

Figure 11:
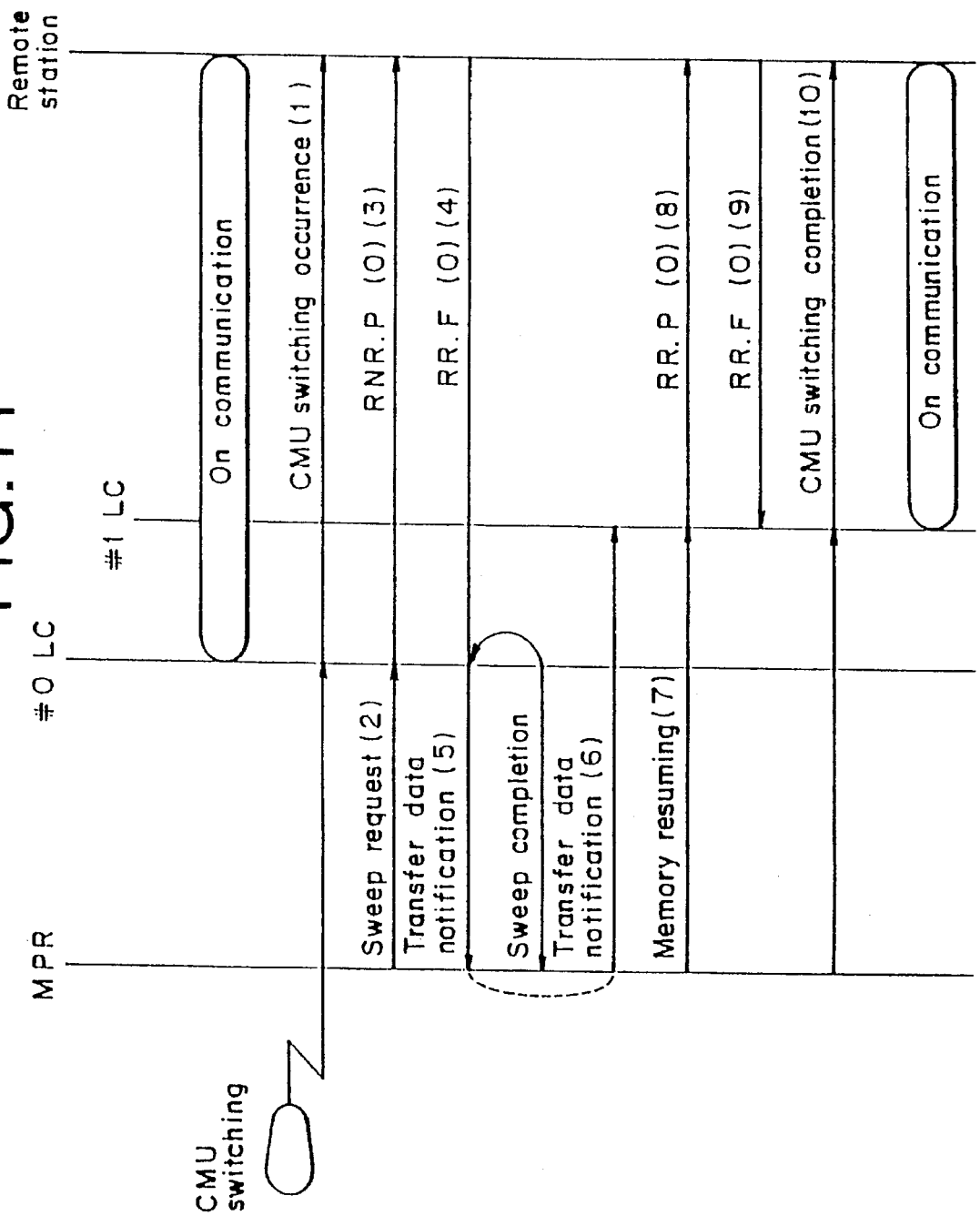
FIG. 11 is a signal sequence diagram in the third embodiment of the present invention.
Figure 12:
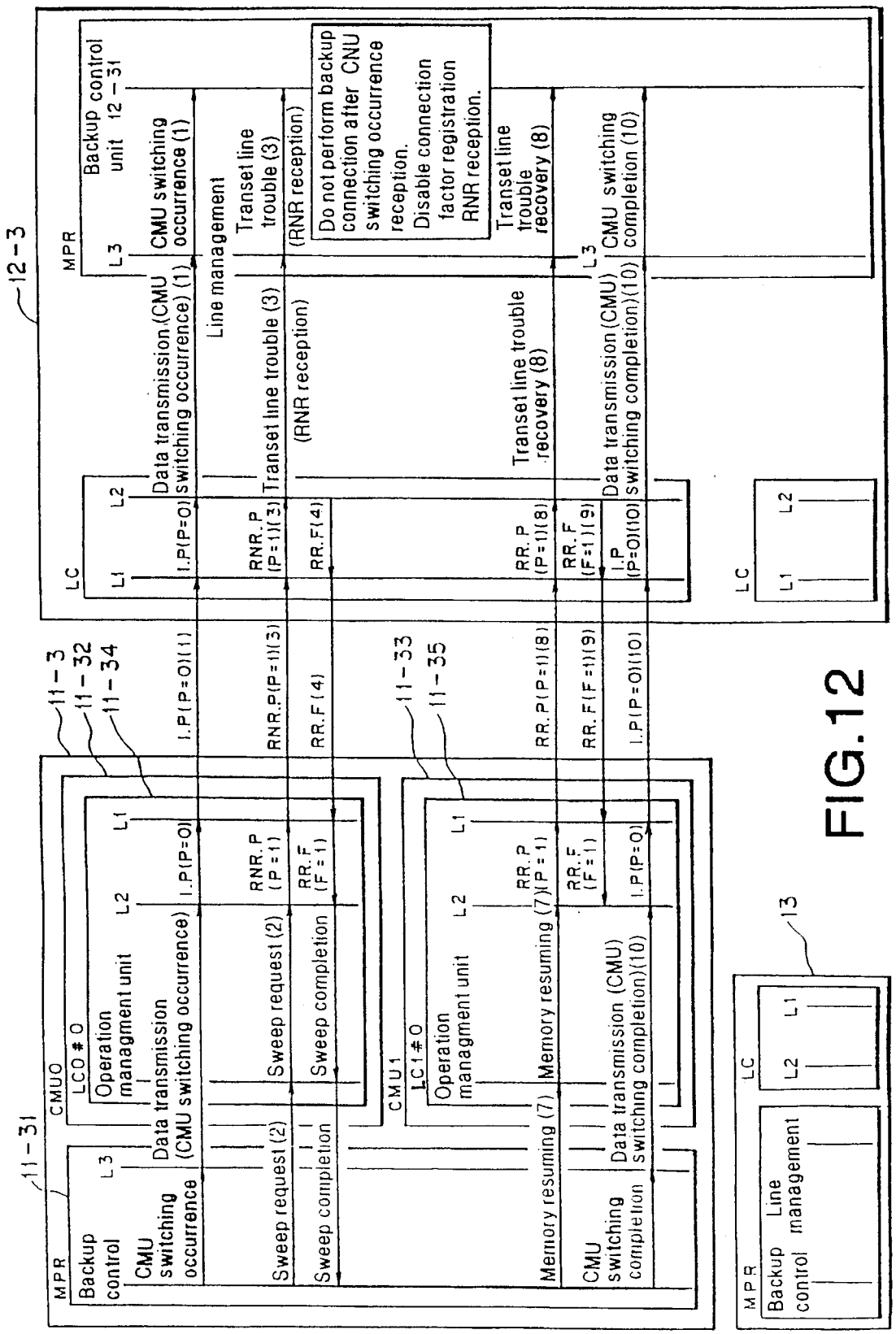
FIG. 12 is a signal sequence diagram in the third embodiment of the present invention.
Figure 13:
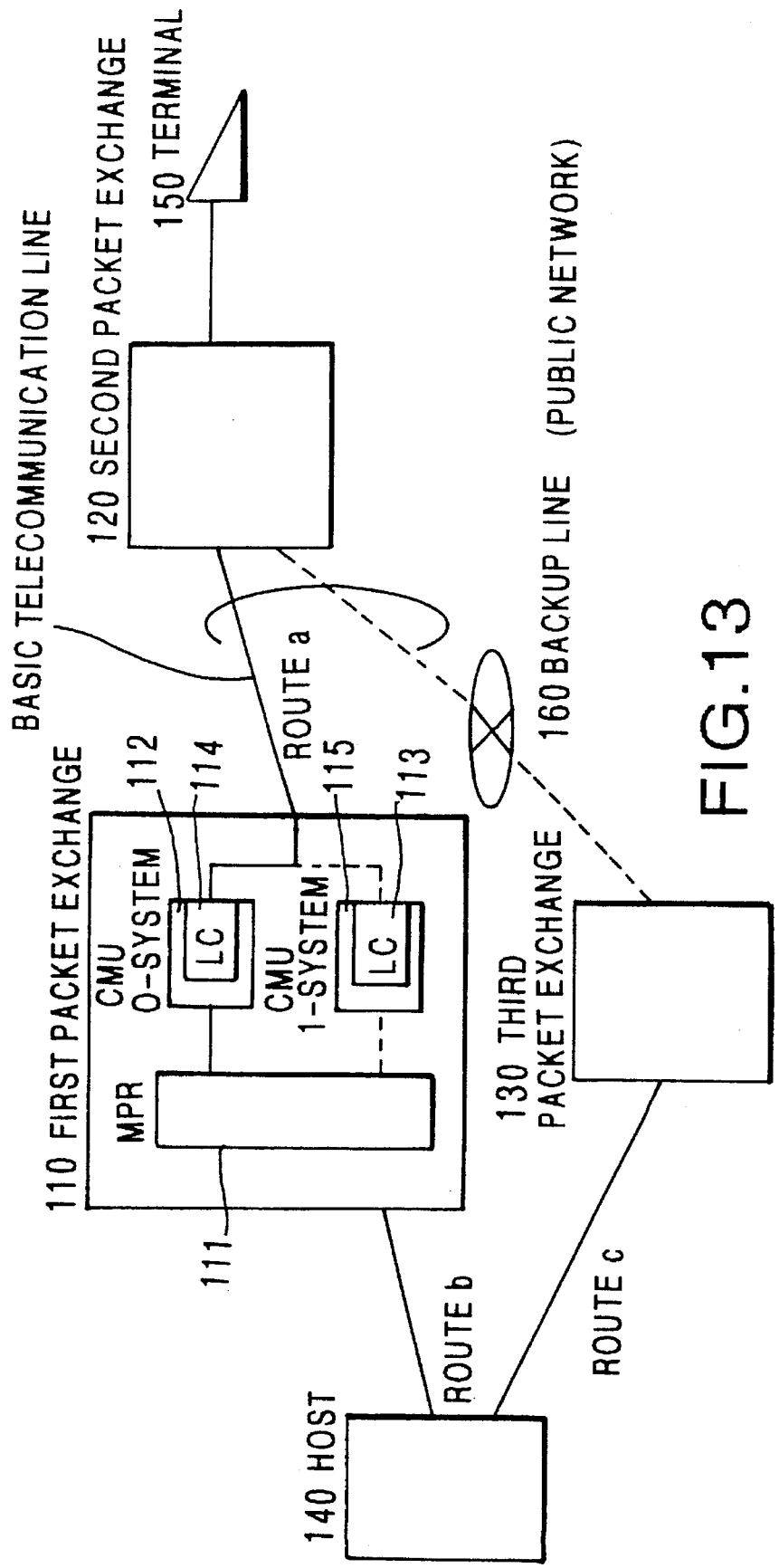
FIG. 13 is a block diagram showing a hybrid system which includes a duplex system using a packet exchange and a backup line using a public network.
Figure 14:
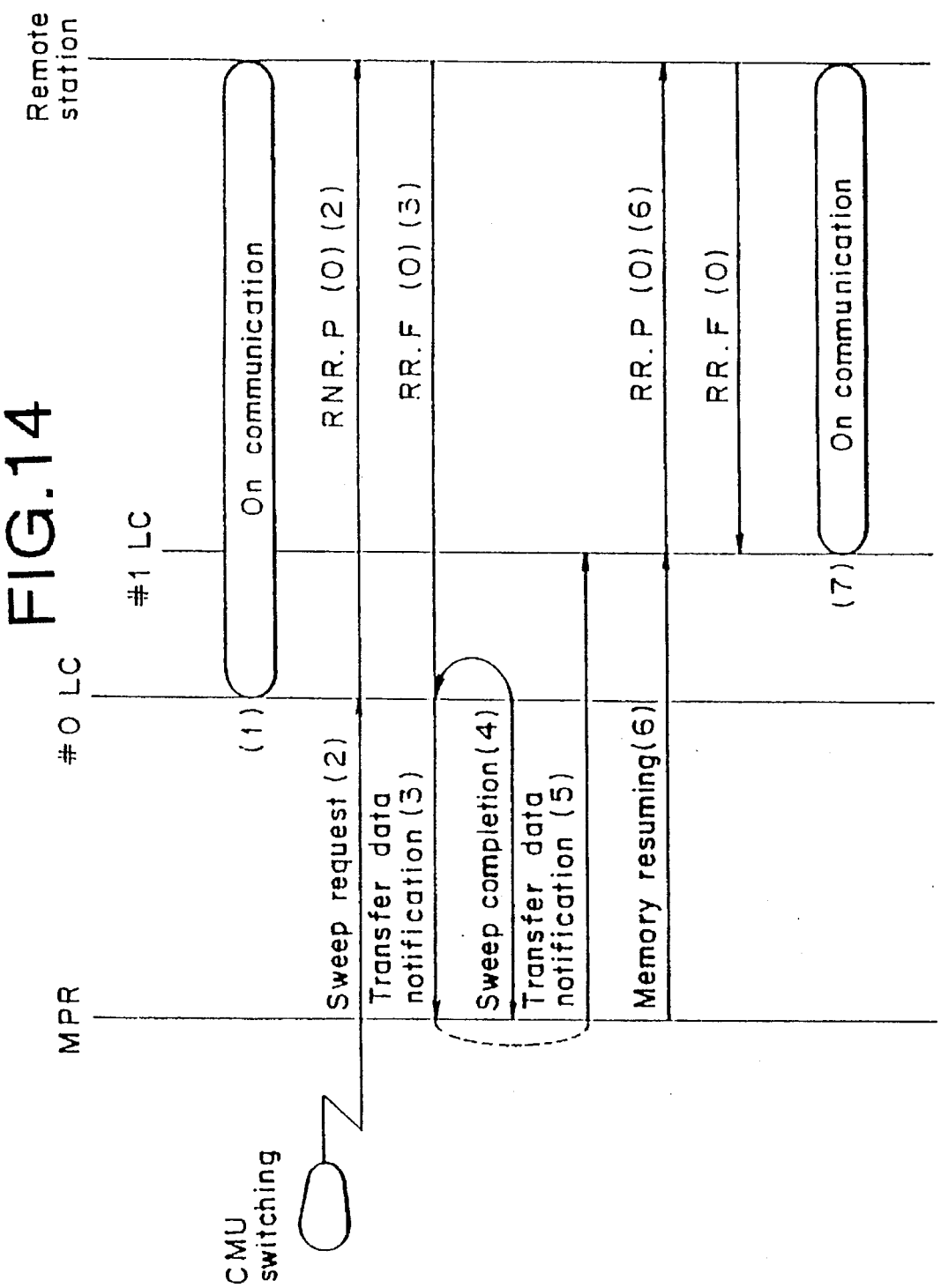
FIG. 14 is a signal sequence diagram of a hybrid system which includes a duplex system using a packet exchange and a backup line using a public network.

When the route is switched to the communication multiplexer 11-32 or the communication multiplexer 11-33 during communicating with a line via the communication multiplexer 11-32, the backup control unit in the communication line management processor 11-31 transmits previously a communication multiplexer transfer occurrence notifying event to the backup control unit 12-31 in the second packet exchange 12-3 before the switching operation (refer to (1) in FIGS. 11 and 12).

Then, when the line via the communication multiplexer 11-32 is broken by switching front the communication multiplexer 11-32 to the communication multiplexer 11-33, a transmission standby frame sweep request is first performed to the processing unit for the layer 2 in the communication multiplexer 11-32 under the backup control in the communication line management processor 11-31 (refer to (2) in FIGS. 11 and 12).

The communication multiplexer 11-32, which has received the sweep request, transmits the communication regulation signal (RNR. P frame signal) to the second packet exchange 12-3 (refer to (3) in FIGS. 11 and 12).

In other words, the transmission regulation signal which has been received by the second packet exchange 12-3 is inputted to the processing unit for the layer 2 in the line control device (LC), a transit line alarm signal notifying that the transmission regulation signal has been received is outputted from the processing unit in the layer 2 to the backup control unit 12-31 in the communication line management processor (refer to (3) in FIG. 12).

In response to the communication regulation signal, the second packet exchange 12-3 transmits a response signal (RR. F frame signal) responding to a normal notification signal from the processing unit for the layer 2 in the line control device to the processing unit for the layer 2 in the communication control device 11-34 (refer to (4) in FIGS. 11 and 12).

When the transmission standby frame has gone, the communication control device 11-34 notifies the communication line management processor 11-31 of the transmission serial number of the frame at the transmission interrupting time (refer to (5) in FIG. 11).

Thereafter, the information that the transmission serial number has been switched to the line via the communication multiplexer 11-33 after returning it to the communication control device 11-35 (refer to (6) in FIG. 11) is notified from the backup control unit in the communication line management processor 11-31 to the processing unit for the layer 2 in the communication multiplexer 11-33 (refer to (7) in FIGS. 11 and 12).

In response to the information, the processing unit for the layer 2 in the communication multiplexer 11-33 transfers the command (RR. P frame signal) of the normal notification signal to the backup control unit 12-31 of the second packet exchange 12-3 (refer to (8) in FIGS. 11 and 12).

Thereafter, the second packet exchange 12-3 outputs a response signal responding to the command of the normal communication signal (RR. P frame signal) to the communication control device 11-35 (refer to (9) in FIGS. 11 and 12), and then transmits a communication multiplexer transfer completion notifying event from the backup control unit in the communication line management processor 11-31 to the backup control unit 12-31 in the second packet exchange 12-3 (refer to (10) in FIGS. 11 and 12).

The backup control unit 12-31 operating as a control device built-in the second packet exchange 12-3 controls not to switch the line to the backup line 16 even when a transmission regulation signal is received during a period between the time a communication multiplexer transfer occurrence notifying event is transmitted and the time a communication multiplexer transfer completion notifying event is received.

As described above, in device and the method which perform a switching control to the hybrid system including the duplex system and the backup line, a backup control protocol is provided that transmits a communication multiplexer transfer occurrence notifying event before switching the line to the communication multiplexer and a communication multiplexer transfer completion notifying event after switching the line to the communication multiplexer. The system includes the first packet exchange 11-3 having the communication line management processor 11-31 and the communication multiplexers 11-32 and 11-33 and the second packet exchange 12-3 having the control device 12-31, instead of the first packet exchanges 11-1 and 11-2 and the second packet exchanges 12-1 and 12-2. The backup control unit 12-31 acting as a control device built in the second packet exchange 12-3 is not switched to the backup line 16 even when a transmission regulation signal is received during the period between the time a communication multiplexer transfer occurrence notifying event is transmitted and the time a communication multiplexer transfer completion notifying event is received. Therefore the frequency of use of the backup line 16 is reduced so that an economical communication system can be realized.

INDUSTRIAL APPLICABILITY

The device and method according to the present invention can be applied to a hybrid system including a duplex system using a packet exchange and a backup line using a public network.

The invention claimed is:

1. A method for performing a switching control to a standby system in a duplex system of a hybrid system also including a backup line, said hybrid system comprising a first exchange (1-1) including a pair of communication multiplexers (1-12, 1-13) forming said duplex system and a communication line management processor (1-11), said backup line (6) using a public network, and a second exchange (2-1) for interchanging between a line connected via said first exchange (1-1) and said backup line (6) using said public network, wherein when one of said communication multiplexers (1-12, 1-13) is switched to said standby system, a transmission regulation signal is transmitted to an opposite communication party to perform a transmission regulation, and a normal communication notification signal is transmitted after a switching operation to resume communication; said method comprising the steps of:

transmitting a normal notification signal to said opposite communication party when one of said communication multiplexers (1-12, 1-13) is switched to said standby system; and transmitting a regulation releasing signal after the switching operation so that a communication is performed without using said backup line (6).

2. A method for performing a switching control according to claim 1, wherein said regulation releasing signal comprises a retransmission request notification signal.

3. A method for performing a switching control according to claim 1, wherein said regulation releasing signal comprises a normal notification signal.

4. A device for performing a switching control to a standby system in a hybrid system having a duplex system and a backup line, said hybrid system comprising a first exchange (1-2) including a pair of communication multiplexers (1-22, 1-23) forming said duplex systems and a communication line management processor (1-21), said backup line (6) using a public network, and a second exchange (2-2) for interchanging between a line connected via said first exchange (1-2) and said backup line (6) using said public network, (whereby) wherein when one of said communication multiplexers (1-22, 1-23) is switched to said standby system, a transmission regulation signal is transmitted to an opposite communication party to perform a transmission regulation, and a normal communication notification signal is transmitted after a switching operation to resume communication;

said second exchange (2-2) comprising:

timer means (2-22) for counting a desired time in response to said transmission regulation signal; and control means (2-22) for inhibiting a switching command to said backup line during the time counting operation of said timer means (2-21).

5. A method for performing a switching control to a standby system in a hybrid system with a duplex system and a backup line, said hybrid system including a first exchange (1-2) including a pair of communication multiplexers (1-22) forming said duplex system, and a communication line management processor (1-21), said backup line (6) using a public network, and a second exchange (2-2) for interchanging between a line connected via said first exchange (1-2) and said backup line (6) using said public network, wherein when said communication multiplexer (1-22, 1-23) is switched to said standby system, a transmission regulation signal is transmitted to an opposite communication party to perform a transmission regulation, and a normal communication notification signal is transmitted after a switching operation to resume communication;

said method comprising the steps of:

counting a desired time in response to said transmission regulation signal; and communicating without using said backup line during the time counting operation.

6. A device for performing a switching control to a standby system in a hybrid system with a duplex system and a backup line, said hybrid system comprising a first exchange (1-3) including a pair of communication multiplexers (1-32, 1-33) forming said duplex system and a communication line management processor (1-31), said backup line (6) using a public network, and a second exchange (2-3) for interchanging between a line connected via said first exchange (1-3) and said backup line (6) using said public network, wherein when one of said communication multiplexers (1-32, 1-33) is switched to said standby system, a transmission regulation signal is transmitted to an opposite communication part to perform a transmission regulation, and a normal communication notification signal is transmitted after a switching operation to resume communication;

said hybrid system further comprising backup control protocol having means for transmitting an event notifying a communication multiplex device transfer occurrence before switching of said one of said communication multiplexers (1-32, 1-33), and means for an event notifying a communication multiplex device transfer completion after switching of said one of said communication multiplexers (1-32, 1-33);

said second exchange (2-3) including control means (2-3) for inhibiting a switching command to said backup line even when said transmission regulation signal is received between the time a communication multiplexer transfer completion notifying event is received and the time a communication multiplexer transfer occurrence notifying event is received.

7. A method for performing a switching control to a standby system in a hybrid system including a duplex system of two communication multiplexers and a backup line wherein when said one of said communication multiplexers (1-32, 1-33) is switched to said standby system, a transmission regulation signal is transmitted to an opposite communication party to perform a transmission regulation, and a normal communication notification signal is transmitted after a switching operation to resume communication;

said hybrid system including a first exchange incorporating said communication multiplexers, a second exchange for interchanging between a line connected via said first exchange and said backup line, and a backup control protocol, said method comprising the steps of transmitting an event notifying a communication multiplex device transfer occurrence before switching of one of said communication multiplexers (1-32, 1-33); and transmitting an event notifying a communication multiplex device transfer completion after switching of said one of said communication multiplexers (1-32, 1-33);

wherein a communication is performed without using said backup line to said second exchange (2-3) even when said transmission regulation signal is received between the time a communication multiplexer transfer completion notifying event is received and the time a communication multiplexer transfer occurrence notifying event is received.

* * * * *